United States Patent
Suzuki et al.

(10) Patent No.: US 8,094,134 B2
(45) Date of Patent: Jan. 10, 2012

(54) TOUCH PANEL HAVING PRESS DETECTION FUNCTION AND PRESSURE SENSITIVE SENSOR FOR THE TOUCH PANEL

(75) Inventors: Takahiro Suzuki, Kyoto (JP); Yoshihiro Kai, Kyoto (JP); Yuko Endo, Kyoto (JP); Yuichiro Takai, Kyoto (JP); Jun Shimizu, Kyoto (JP); Yoshitaka Yamaoka, Kyoto (JP); Shuzo Okumura, Kyoto (JP); Seiko Hirai, Kyoto (JP); Yohko Imai, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 13/054,624

(22) PCT Filed: Dec. 24, 2009

(86) PCT No.: PCT/JP2009/071386
§ 371 (c)(1),
(2), (4) Date: Jan. 18, 2011

(87) PCT Pub. No.: WO2010/074116
PCT Pub. Date: Jul. 1, 2010

(65) Prior Publication Data
US 2011/0115738 A1 May 19, 2011

(30) Foreign Application Priority Data

Dec. 25, 2008 (JP) ................. 2008-330284
Dec. 25, 2008 (JP) ................. 2008-330288
Feb. 27, 2009 (JP) ................. 2009-047006

(51) Int. Cl.
*G06F 3/041* (2006.01)
(52) U.S. Cl. .................... 345/173; 178/18.01
(58) Field of Classification Search .......... 345/173–178; 178/18.01–18.11
See application file for complete search history.

(56) References Cited

U.S. PATENT DOCUMENTS 5,714,694 A * 2/1998 Diessner .................. 73/862.632
(Continued)

FOREIGN PATENT DOCUMENTS

CA 2 355 434 2/2002
(Continued)

OTHER PUBLICATIONS

International Search Report issued Feb. 23, 2010 in International (PCT) Application No. PCT/JP2009/071386.
(Continued)

*Primary Examiner* — Bipin Shalwala
*Assistant Examiner* — Steven Holton
(74) *Attorney, Agent, or Firm* — Wenderoth, Lind & Ponack, L.L.P.

(57) ABSTRACT

An object of the present invention is to provide a touch panel having a press detection function, which makes it possible to suppress degradation of visibility of a display unit of a display device even when mounted on an electronic device, and also to improve a pressure measuring precision. For this purpose, the touch panel of the present invention includes a first substrate, a second substrate disposed oppose to the first substrate, a pair of electrodes disposed on either one of opposed surfaces of the respective substrates or disposed separately on both of the surfaces, pressure sensitive ink members disposed with a gap from at least one of the pair of electrodes, each of the pressure sensitive ink members having an electrical characteristic varied by a pressing force applied thereto, and a gap retaining member for bonding the first and second substrates to each other and for retaining a gap between each of the pressure sensitive inks and at least one of the pair of electrodes, wherein the pair of electrodes are disposed in a frame shape along an edge portion of the first or second substrate, and the pressure sensitive ink members are scattered along the edge portion of the first or second substrate so that, when the first or second substrate is deformed upon an application of an external force, at least one of them is made in contact with both of the pair of electrodes so as to make the two electrodes conductive to each other.

16 Claims, 28 Drawing Sheets

U.S. PATENT DOCUMENTS

| | | | |
|---|---|---|---|
| 5,854,625 A * | 12/1998 | Frisch et al. | 345/173 |
| 6,272,936 B1 | 8/2001 | Oreper et al. | |
| 6,492,979 B1 * | 12/2002 | Kent et al. | 345/173 |
| 7,212,894 B2 * | 5/2007 | Hattori et al. | 701/45 |
| 2005/0072249 A1 * | 4/2005 | Maeda et al. | 73/862.046 |
| 2007/0040816 A1 | 2/2007 | Toyomaki | |
| 2009/0243817 A1 * | 10/2009 | Son | 340/407.2 |
| 2009/0267902 A1 | 10/2009 | Nambu et al. | |
| 2010/0265208 A1 * | 10/2010 | Kim et al. | 345/174 |

FOREIGN PATENT DOCUMENTS

| | | |
|---|---|---|
| EP | 1 106 977 | 6/2001 |
| EP | 1 983 411 | 10/2008 |
| JP | 6-59795 | 3/1994 |
| JP | 2000-222129 | 8/2000 |
| JP | 2002-48658 | 2/2002 |
| JP | 2004-93442 | 3/2004 |
| JP | 2007-52183 | 3/2007 |
| JP | 2008-046817 | 2/2008 |
| WO | 2007/034591 | 3/2007 |
| WO | 2008/116547 | 10/2008 |

OTHER PUBLICATIONS

Supplementary European Search Report issued Aug. 4, 2011 in corresponding European Application No. 09 83 4914.

International Preliminary Report on Patentability and Written Opinion issued Aug. 18, 2011 in corresponding International Application No. PCT/JP2009/071386 (translation).

* cited by examiner

TOUCH PANEL HAVING PRESS DETECTION FUNCTION AND PRESSURE SENSITIVE SENSOR FOR THE TOUCH PANEL

BACKGROUND OF THE INVENTION

I. Technical Field

The present invention relates to a touch panel having a press detection function which, out of an external force applied to a surface, measures a component in a direction perpendicular to the surface, and a pressure sensitive sensor for the touch panel.

II. Description of the Related Art

Conventionally, a pressure sensitive sensor has been known as a sensor having a press detection function for measuring a pressure of an external force (referred to also as a pressing force) that is applied to a certain surface. As this pressure sensitive sensor, for example, a sensor having a structure described in Japanese Unexamined Patent Publication No. 2002-48658 has been known. The sensor of Patent Document 1 is designed such that plastic films, each formed by stacking an electrode and a pressure sensitive ink layer thereon in this order, are combined with each other so as to make the pressure sensitive ink members face each other, with an insulating layer having adhesive layers disposed on front and rear surfaces being interposed therebetween. Moreover, in the sensor of Japanese Unexamined Patent Publication No. 2002-48658, since concave/convex portions are formed on the front surface of the pressure sensitive ink layer, a space having a predetermined distance is formed between the upper and lower pressure sensitive ink layers so as to prevent the upper and lower pressure sensitive ink layers from being made in tight contact with each other when no pressure is applied thereto.

In the sensor of Japanese Unexamined Patent Publication No. 2002-48658 having the above-mentioned structure, in a case where a pressing force is applied to the upper film, the electrode of the upper film corresponding to the portion pressed by the pressure by the warped upper film is made in contact with the electrode of the lower film through the pressure sensitive ink layer. Thus, the two electrodes are made conductive to each other. In the sensor of Japanese Unexamined Patent Publication No. 2002-48658, by detecting the conductive state of the two electrodes and fluctuations in the resistance value in response to the pressure applied to the pressure sensitive ink layer, it is possible to measure the pressure applied to the upper film. If the sensor of Japanese Unexamined Patent Publication No. 2002-48658 is attached to an inside of a vehicle-use seat, it becomes possible to determine whether or not a passenger is sitting on the seat and also to determine physical characteristics of the passenger based upon a pressure distribution.

SUMMARY OF THE INVENTION

In recent years, in electronic devices having a touch panel, in particular, in portable electronic devices such as portable telephones or game machines, there have been demands for the addition of a press detection function to the touch panel, as a device in place of, for example, a determination button. In general, the portable electronic device has a structure in which a display unit of a display device in a casing can be visually recognized through a touch panel. Since the sensor of Japanese Unexamined Patent Publication No. 2002-48658 is designed such that electrodes and pressure sensitive ink layers are disposed on most of the portions of the surfaces of the upper and lower films, the transmittance (visibility) is poor.

For this reason, in a case where a touch panel to which the sensor of Japanese Unexamined Patent Publication No. 2002-48658 is attached is mounted as it is on an electronic device, the visibility of the display unit of the display device becomes poor.

Moreover, since each of the upper and lower films normally has a warp though little, it is difficult to allow the surface of the pressure sensitive ink layer to have an even height. That is, the surface of the pressure sensitive ink layer has irregular concave/convex portions. For this reason, even when an equal pressure is applied to the upper film, the contact area between the pressure sensitive ink layer on the upper film side and the pressure sensitive ink layer of the lower film side becomes different depending on the positions to which the pressure is applied or depending on products. Consequently, the resistance value to be detected does not become constant but deviates. A resulting problem is that the pressure measuring precision is lowered. In particular, as the pressure to be applied to the upper film becomes smaller, the lowering of the pressure measuring precision becomes more significant.

Therefore, an object of the present invention is to improve the above-mentioned issues, and thus to provide a touch panel having a press detection function that can suppress degradation of visibility of the display unit of the display device and also to improve the pressure measuring precision even when mounted on an electronic device, as well as a pressure sensitive sensor used for the touch panel.

In order to improve the above technical issues, the present invention provides a touch panel having a press detection function in the following structure, and a pressure sensitive sensor for such a touch panel.

According to a first aspect of the present invention, there is provided a touch panel provided with a press detection function, the touch panel comprising a pressure sensitive sensor for the touch panel, wherein, the pressure sensitive sensor for the touch panel includes:
a first substrate;
a second substrate disposed so as to be opposed to the first substrate;
a pair of electrodes that are disposed on either one of a surface of the first substrate opposed to the second substrate and a surface of the second substrate opposed to the first substrate, or disposed separately on both of the surfaces;
pressure sensitive ink members having conductive property of which electric characteristic is varied by a pressing force applied thereto, each of the pressure sensitive ink member being disposed on the surface of the first substrate opposed to the second substrate or the surface of the second substrate opposed to the first substrate with a gap interposed from at least one of the pair of electrodes; and
a gap retaining member disposed on an opposed area between the first substrate and the second substrate, the gap retaining member having such sticking property that the first substrate and the second substrate are bonded to each other and retaining the gap between each of the pressure sensitive ink members and at least one of the pair of electrodes,
the pair of electrodes is disposed in a frame shape along an edge portion of the first or second substrate, and
the pressure sensitive ink members are located in a scattered manner along the edge portion of the first or second substrate, and when, upon application of an external force in a thickness direction of the first substrate, the first or second substrate is deformed, the pressure sensitive ink member is made in contact with both of the pair of electrodes so that the pair of electrodes are made conductive to each other.

In this case, the "pressure sensitive ink member" may be divided into two or more portions. For example, in a case where the "pressure sensitive ink member" is made of two portions, upon deformation of the first or second substrate, these two portions are made in contact with each other to be integralized so that they may be made in contact with both of the pair of electrodes to make the two electrodes conductive to each other.

According to a second aspect of the present invention, there is provided the touch panel having a press detection function as defined in the first aspect, wherein the gap retaining member is a double-sided sticky tape with a sticky agent being applied onto two surfaces of a core member.

According to a third aspect of the present invention, there is provided the touch panel having a press detection function as defined in the first or second aspect, wherein the pressure sensitive ink members are provided as dots disposed on a plurality of corners of the first substrate or the second substrate.

According to a fourth aspect of the present invention, there is provided the touch panel having a press detection function as defined in the first or second aspect, wherein each of the first substrate and the second substrate has a rectangular outer shape, and the pressure sensitive ink members are provided in a broken line shape along only each of edge portions of paired longer sides of the first substrate or the second substrate.

According to a fifth aspect of the present invention, there is provided the touch panel having a press detection function as defined in any one of the first to fourth aspects, wherein the pressure sensitive ink members are disposed at a pitch in a range of from 9.75 mm to 25.75 mm.

According to a sixth aspect of the present invention, there is provided the touch panel having a press detection function as defined in any one of the first to fifth aspects, wherein each of the first substrate, the second substrate, and the gap retaining member is formed into a frame shape.

According to a seventh aspect of the present invention, there is provided the touch panel having a press detection function as defined in any one of the first to fifth aspects, wherein each of the first substrate and the second substrate is made of a transparent material so as to have a flat plate shape, with a transparent window portion being formed on a portion without the pair of electrodes formed therein.

According to an eighth aspect of the present invention, there is provided the touch panel having a press detection function as defined in the seventh aspect, wherein a transparent electromagnetic shielding member is disposed on the first substrate or the second substrate so as to include the transparent window portion.

According to a ninth aspect of the present invention, there is provided the touch panel having a press detection function as defined in the seventh aspect, wherein the second substrate has a transparent electrode formed on the transparent window portion of the surface opposed to the first substrate into a striped pattern in one direction.

According to a tenth aspect of the present invention, there is provided the touch panel having a press detection function as defined in the ninth aspect, wherein a third substrate is stacked on a surface of the second substrate on a side without the pair of electrodes formed thereon, with a sticky agent interposed therebetween, and the third substrate is made of a transparent material so as to have a flat plate shape, and is provided with a transparent electrode formed on an area corresponding to the transparent window portion of the surface opposed to the second substrate into a striped pattern in a direction crossing the one direction.

According to an eleventh aspect of the present invention, there is provided the touch panel having a press detection function as defined in any one of the first to tenth aspects, further comprising:

a supporting member stacked and disposed on at least one of surfaces of the first substrate and the second substrate on a side without the pair of electrodes formed thereon.

According to a twelfth aspect of the present invention, there is provided the touch panel having a press detection function as defined in the eleventh aspect, wherein the supporting member is provided on a rear side of a position where the pressure sensitive ink member is formed.

According to a thirteenth aspect of the present invention, there is provided the touch panel having a press detection function as defined in any one of the first to twelfth aspects, wherein one of the pair of electrodes is disposed on the first substrate, an other one of the pair of electrodes is disposed on the second substrate, and the pressure sensitive ink members are provided to cover a plurality of portions of the one or the other one of the pair of electrodes.

According to a fourteenth aspect of the present invention, there is provided the touch panel having a press detection function as defined in the thirteenth aspect, wherein the pair of electrodes are covered with either one of the pressure sensitive ink member and the gap retaining member.

According to a fifteenth aspect of the present invention, there is provided the touch panel having a press detection function as defined in any one of the first to twelfth aspects, wherein the pair of electrodes are disposed on the first substrate with a gap therebetween, and the pressure sensitive ink members are disposed on the second substrate.

According to a sixteenth aspect of the present invention, there is provided a pressure sensitive sensor for a touch panel used in the touch panel as defined in any one of the first to fifteenth aspects.

In accordance with the touch panel having a press detection function and the pressure sensitive sensor for the touch panel of the present invention, since the pair of electrodes are disposed in the frame form along the edge portion of the first or second substrate, the transmittance of the inner portion surrounded by the frame is not lowered. Therefore, even when mounted on an electronic device, degradation of visibility of the display unit can be suppressed by disposing the display unit of the display device on the inner side of the frame. Moreover, since the pressure sensitive ink members are scattered along the edge portion of the first or second substrate, it is possible to suppress deviations of the area where the pressure sensitive ink member is made in contact with both of the pair of electrodes when an equal pressure is applied to the first substrate. Therefore, it is possible to improve the pressure measuring precision.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE INVENTION

Figure 1:
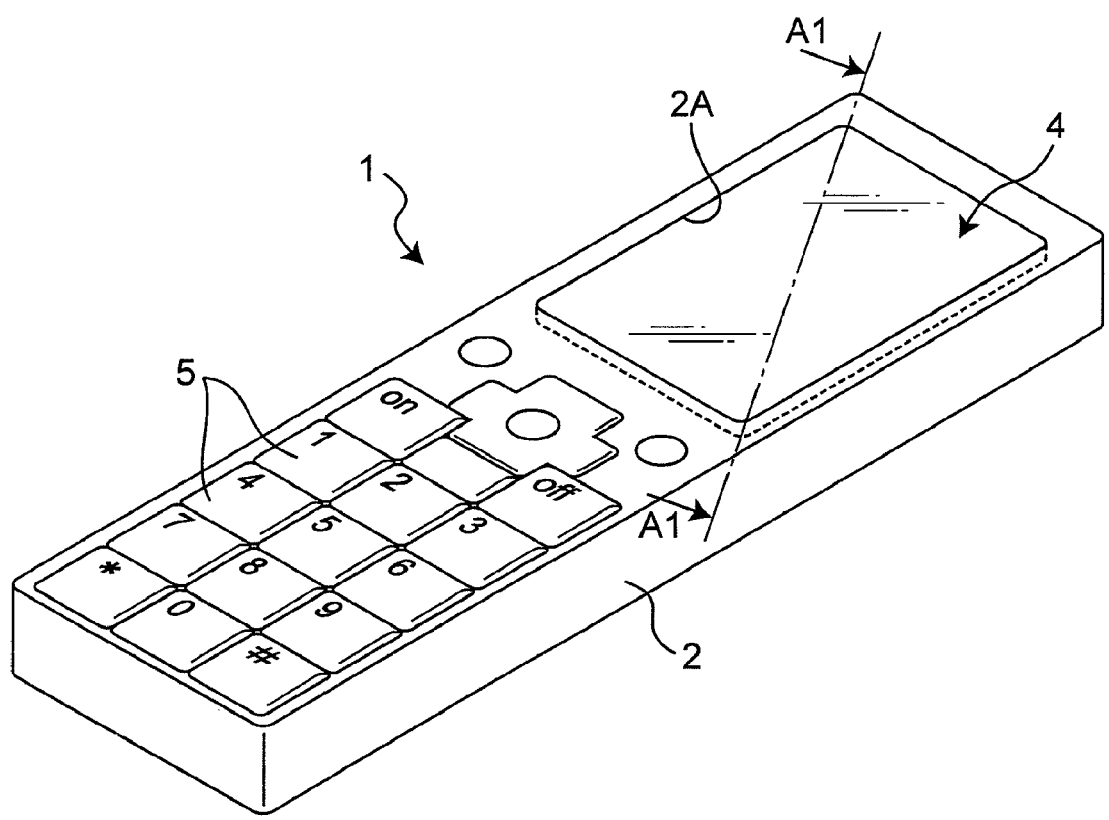
FIG. 1 is a perspective view that shows a portable telephone in which a touch input device in accordance with a first embodiment of the present invention is mounted.

Before the description of the present invention proceeds, it is to be noted that like parts are designated by like reference numerals throughout the accompanying drawings.

Referring to the drawings, the following description will discuss embodiments of the present invention.

First Embodiment

A touch panel having a press detection function in accordance with a first embodiment of the present invention has a structure in which a tough panel main body and a pressure sensitive sensor are integrally configured so that, in addition to detection of a position on the tough panel main body, a strength of a pressing force can be detected by the pressure sensitive sensor. In the following description, this touch panel having the press detection function is referred to as a touch input panel. The touch input device in accordance with the first embodiment preferably functions as a touch input device for a display of a portable electronic device, such as an electronic device, in particular, a portable telephone or a game machine. In the first embodiment, the description will be given by exemplifying a structure in which the tough input device is mounted on a portable telephone.

Figure 2:
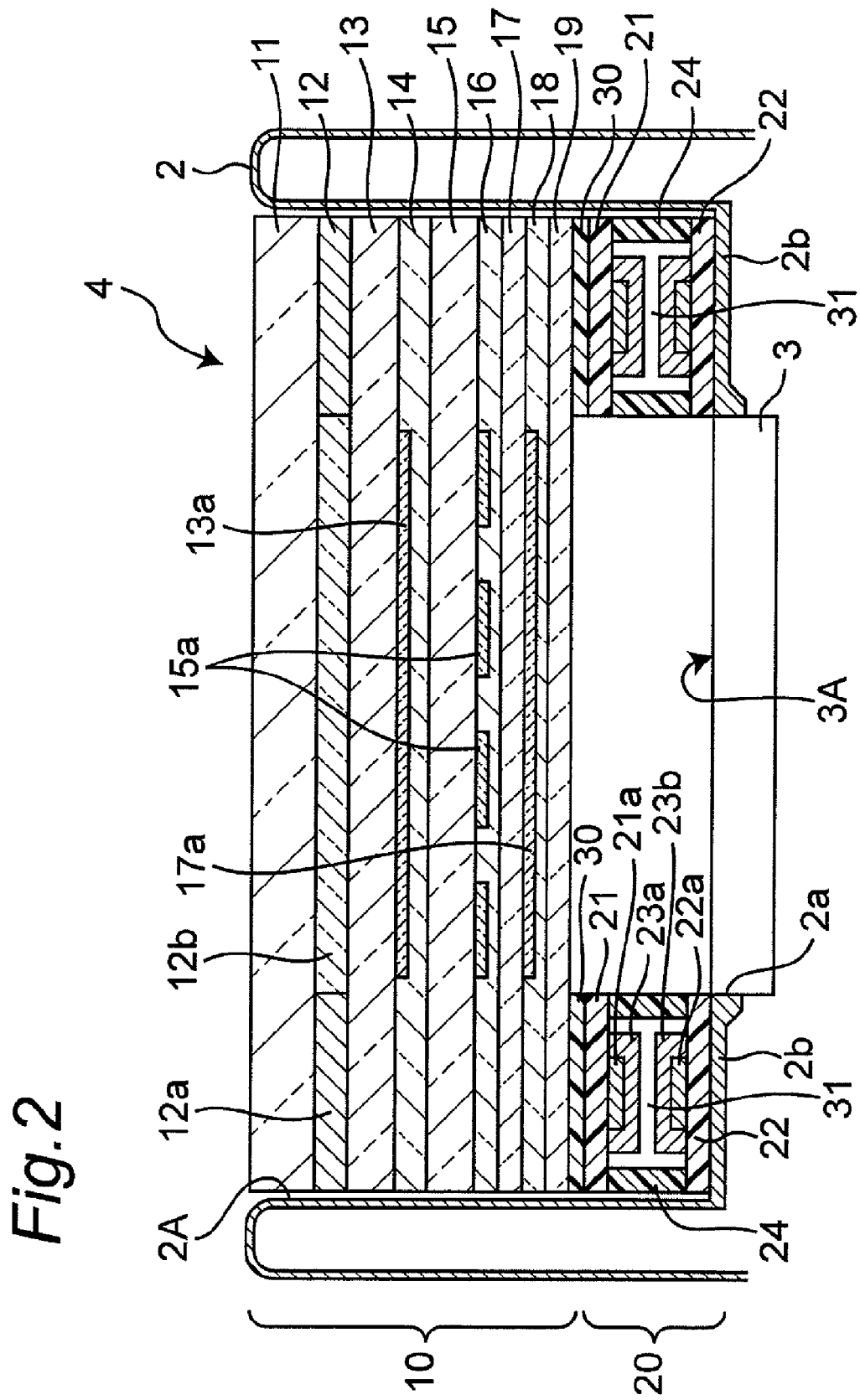
FIG. 2 is a cross-sectional view taken along line A1-A1 in FIG. 1.
Figure 3:
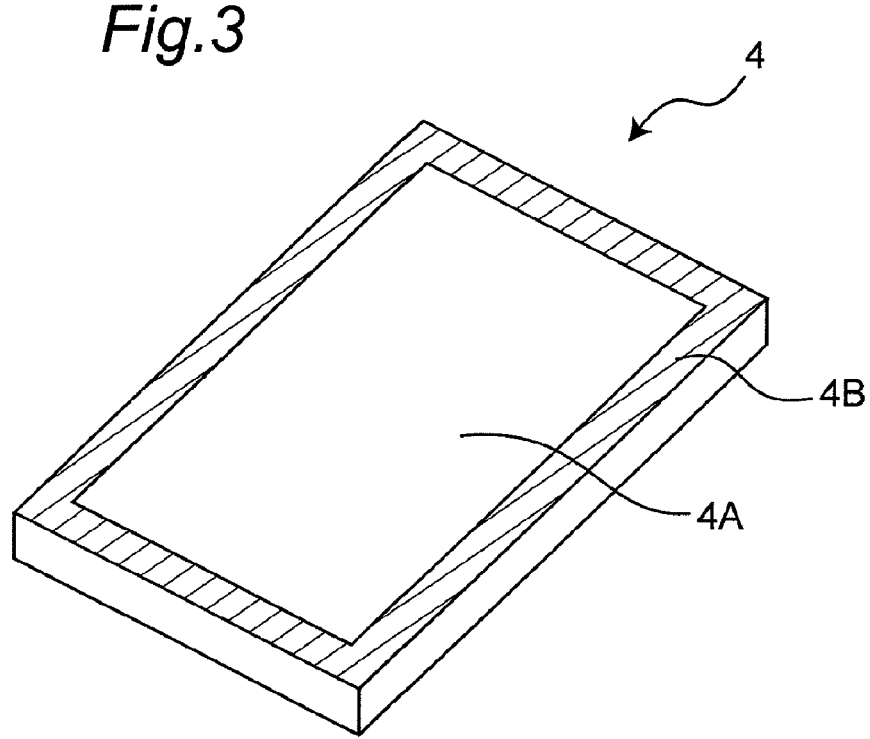
FIG. 3 is a perspective view that shows the touch input device in accordance with the first embodiment of the present invention.

FIG. 1 is a perspective view exemplifying a portable telephone in which the touch input device in accordance with the first embodiment is mounted, and FIG. 2 is a cross-sectional view taken along line A1-A1 in FIG. 1. FIG. 3 is a perspective view of the tough input device.

As shown in FIGS. 1 and 2, a portable telephone 1 includes a casing 2 in a rectangular parallelepiped shape, made of a synthetic resin, and provided on the front surface thereof with a rectangular display window 2A, a display device 3 having a rectangular display unit 3A made of a liquid crystal, an organic EL, or the like and built in the casing 2, a touch input device 4 fitted to the display window 2A, and a plurality of input keys 5 disposed on the front surface of the casing 2.

The display window 2A of the casing 2 is formed with a difference in height which allows the touch input device 4 to be fitted thereto. On the bottom surface of the display window 2A, a rectangular opening section 2a is formed so as to allow the display unit 3A of the display device 3 to be visually recognized. The touch input device 4 is disposed on a rectangular frame portion 2b on the periphery of the opening section 2a so as to shield the opening section 2a.

Shape or size of the display window 2A may be changed in various ways depending on shape or size of the touch input device 4. The difference in height of the display window 2A may be changed in various ways depending on the thickness or the like of the touch input device 4. The shape or size of the opening section 2a of the display window 2A may be changed in various ways depending on shape, size, or the like of the display unit 3A. In this case, the display window 2A, the opening section 2a, the display unit 3A, and the touch input device 4 are formed into rectangular shapes, and the difference in height of the display window 2A is set so as to make the surface of the casing 2 and the surface of the touch input device 4 have the same height.

As shown in FIG. 3, the touch input device 4 is provided with a transparent window portion 4A, a decorative area 4B in a rectangular frame shape, disposed on the periphery of the transparent window portion 4A. In a case where the touch input device 4 is disposed on the display window 2A of the casing 2 of the portable telephone, the display unit 3A of the display device 3 can be visually recognized through the transparent window portion 4A.

Moreover, the touch input device 4 is provided with a touch panel main body 10 which, based upon a touch operation onto an input surface of the tough input device 4, allows plane coordinates (X, Y coordinates) corresponding to an operation position to be detected, and a pressure sensitive sensor 20 that detects the strength of the pressing force applied in a direction (z-direction) orthogonal to the input surface.

First, the following description will discuss the structure of the touch panel main body 10.

The touch panel main body 10 is a touch panel of, for example, a resistance film type or an electrostatic capacity type. The description will exemplify a structure in which a touch panel of the electrostatic capacity type is used as the touch panel main body 10. The touch panel main body 10 is formed by successively stacking in this order a transparent supporting substrate 11 forming the input surface, a decorative film 12, a transparent film 13 for detecting X-coordinate, a transparent sticky layer 14, a transparent film 15 for detecting Y-coordinate, a transparent sticky layer 16, a shielding transparent film 17, a transparent sticky layer 18, and a hard coat film 19.

The transparent supporting substrate 11 is composed of a material that is superior in transparency, rigidity, and processability, such as glass, polymethylmethacrylate (PMMA) resin, polycarbonate (PC) resin, or the like. Onto the lower surface of the transparent supporting substrate 11, the decorative film 12 is bonded by a transparent sticky agent (not shown).

The decorative film 12 is formed by applying into a rectangular frame shape ink onto a peripheral surface of a transparent film used for the decorative film. The decorative area 4B having a rectangular shape on the touch input device 4 is formed by a decorative portion 12a in a rectangular frame shape corresponding to the portion applied with the ink, and a rectangular portion 12b where no decorative portion 12a is formed configures a transparent window portion 4A of the touch input device 4.

As the ink configuring the decorative portion 12a, desirably used is a coloring ink which contains as a binder a resin such as polyvinyl chloride resin, polyamide resin, polyester resin, polyacrylic resin, polyurethane resin, polyvinyl acetal resin, polyester urethane resin, cellulose ester resin, or alkyd resin, as well as a pigment or a dye having an appropriate color as a colorant. Instead of coating, the decorative portion 12a may be formed by a printing process. In the case of forming the decorative portion 12a by the printing process, a normally used printing method such as an offset printing method, a gravure printing method, or a screen printing method may be utilized.

Figure 4:
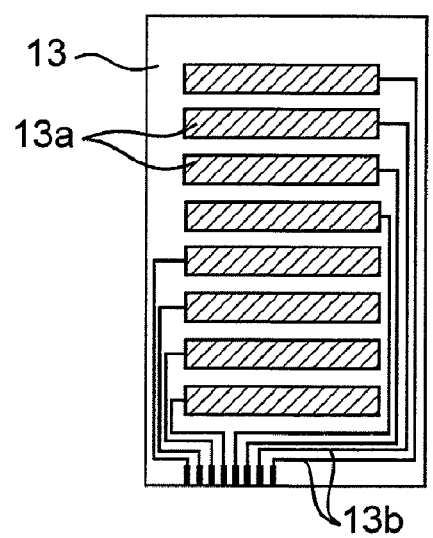
FIG. 4 is a plan view that shows a transparent film for detecting X-coordinate.

Onto the lower surface of the decorative film 12, the X-coordinate detecting transparent film 13 is bonded by a transparent sticky agent (not shown). On the lower surface of the X-coordinate detecting transparent film 13, for example, as shown in FIG. 4, there are formed an upper transparent electrode 13a disposed in a stripe pattern in one direction, and a lead-out circuit 13b having a predetermined pattern so as to be conducted with an external member such as a bus bar or a lead-out line. Moreover, on the lower surface of the X-coordinate detecting transparent film 13, the transparent sticky layer 14 is disposed so as to cover the upper transparent electrode 13a and the lead-out circuit 13b, and the Y-coordinate detecting transparent film 15 is bonded thereto by the transparent sticky layer 14. The transparent sticky layer 14 is prepared as, for example, a paste, an adhesive agent, or a double-sided sticky tape.

Figure 5:
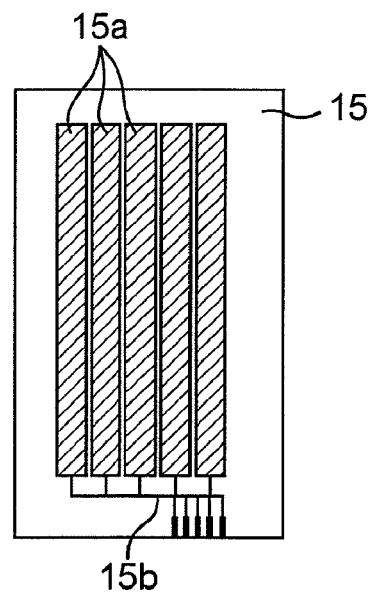
FIG. 5 is a plan view that shows a transparent film for detecting Y-coordinate.

On the lower surface of the Y-coordinate detecting transparent film 15, as shown in FIG. 5, there are formed a lower transparent electrode 15a disposed in a stripe pattern in a direction crossing (for example, orthogonal to) the upper transparent electrode 13a, and a lead-out circuit 15b having a predetermined pattern so as to be conducted with an external member such as a bus bar or a lead-out line. Moreover, on the lower surface of the Y-coordinate detecting transparent film 15, the transparent sticky layer 16 is disposed so as to cover the lower transparent electrode 15a and the lead-out circuit 15b, and a shielding transparent film 17 is bonded thereto by the transparent sticky layer 16. The transparent sticky layer 16 is prepared as, for example, a paste, an adhesive agent, or a double-sided sticky tape.

Figure 6:
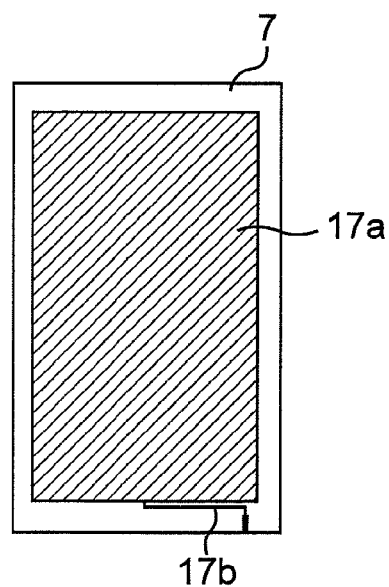
FIG. 6 is a plan view that shows a shielding transparent film.

On the lower surface of the shielding transparent film 17, as shown in FIG. 6, there are formed a rectangular shielding transparent electrode 17a and a lead-out circuit 17b having a predetermined pattern so as to be connected to the casing 2 (ground). The shielding transparent electrode 17a has a size larger than that of the display unit 3A of the display device 3, and is disposed at a position to enclose the display unit 3A when viewed in the thickness direction of the touch input device 4. Thus, the shielding transparent electrode 17a serves as a so-called electromagnetic shield that shields disturbing electromagnetic waves (noises of an alternating current) generated by the display device 3. Moreover, the transparent sticky layer 18 is disposed on the lower surface of the shielding transparent film 17 so as to cover the shielding transparent electrode 17a and the lead-out circuit 17b, and the hard coat film 19 is bonded thereto by the transparent sticky layer 18. The transparent sticky layer 18 is prepared as, for example, a paste, an adhesive agent, or a double-sided sticky tape. The hard coat film 19 is a member that protects the surface of the transparent sticky layer 18 from scratches upon production.

The X-coordinate detecting transparent film 13, the Y-coordinate detecting transparent film 15, and the shielding transparent film 17 are respectively made of, for example, polyethyleneterephthalate (PET) resin, polycarbonate (PC) resin, or the like. The hard coat film 19 is made of, for example, polyethylene terephthalate (PET) resin, polyimide, or the like.

The transparent electrodes 13a, 15a, 17a and the lead-out circuits 13b, 15b, 17b are respectively made of transparent conductive films. Examples of the materials for the transparent conductive films include a metal oxide such as tin oxide, indium oxide, antimony oxide, zinc oxide, cadmium oxide, or ITO, or a thin film of a conductive polymer. As the formation method of the transparent electrodes 13a, 15a, 17a and the lead-out circuits 13b, 15b, 17b, there is exemplified a method in which, after a conductive coat film has been formed on the entire surface of each of transparent films 13, 15, and 17 by a vacuum vapor deposition method, a sputtering method, an ion plating method, a CVD method, a roll coater method, or the like, unnecessary portions are etched and removed. The etching is carried out by processes in which, after forming resist on portions to be left as electrodes by a photolithography method, a screen method, or the like, the resulting films are immersed in an etching solution such as hydrochloric acid. Alternatively, the etching may also be carried out by processes in which, after the formation of the resist, an etching solution is sprayed thereon so that the conductive coat film on portions having no resist formed thereon is removed, and the resulting film is then immersed in a solvent so that the resist is swelled or dissolved to be removed. Further alternatively, the transparent electrodes 13a, 15a, 17a and the lead-out circuits 13b, 15b, 17b may be formed by laser irradiation.

The following description will discuss the structure of the pressure sensitive sensor 20.

Figure 7:
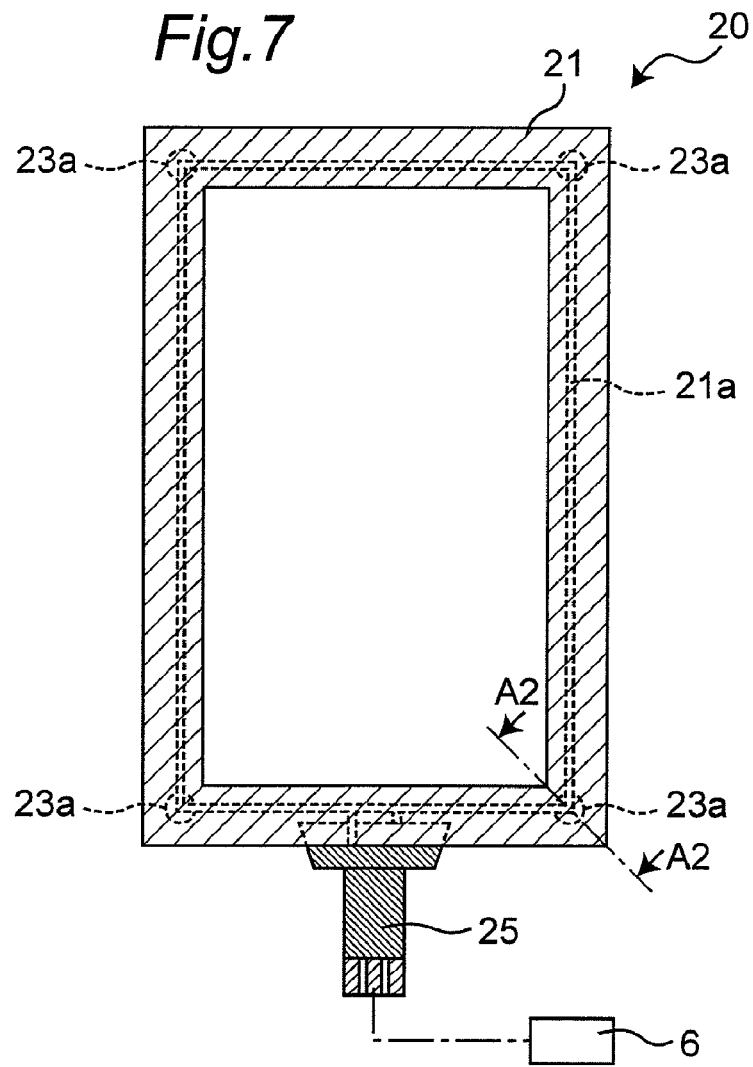
FIG. 7 is a plan view that shows a pressure sensitive sensor provided in the touch input device in accordance with the first embodiment of the present invention.
Figure 8:
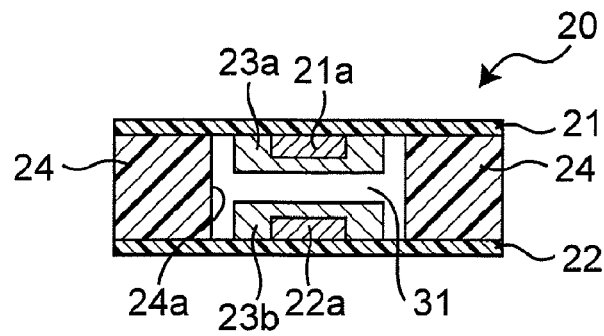
FIG. 8 is a cross-sectional view taken along line A2-A2 in FIG. 7.
Figure 9:
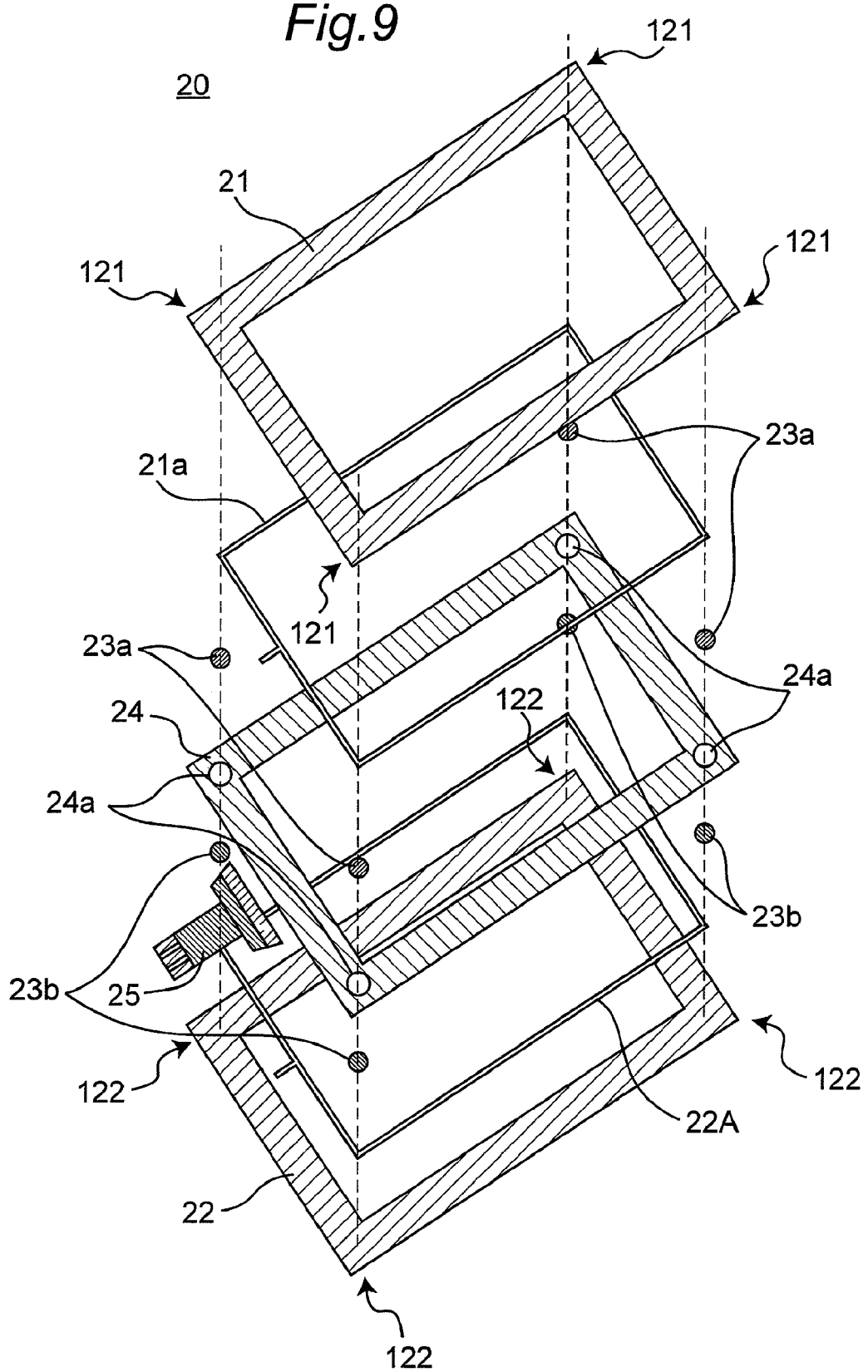
FIG. 9 is an exploded perspective view of the pressure sensitive sensor shown in FIG. 7.

FIG. 7 is a plan view that shows the pressure sensitive sensor 20 in accordance with the first embodiment, and FIG. 8 is a cross-sectional view taken along line A2-A2 in FIG. 7. FIG. 9 is an exploded perspective view of the pressure sensitive sensor 20 shown in FIG. 7.

The pressure sensitive sensor 20 is bonded to the lower surface of the hard coat film 19 of the touch panel main body 10 by, for example, a paste, an adhesive agent, or a sticky agent 30 such as a double-sided sticky tape. The pressure sensitive sensor 20 is formed into a rectangular frame shape so as to be concealed by the decorative portion 12a when viewed from above the touch panel main body 10. Therefore, the respective members configuring the pressure sensitive sensor 20 are not limited to be made of transparent materials, and may be made of colored materials. This embodiment is described by exemplifying the outer shape of the pressure sensitive sensor 20 as a rectangular shape; however, the present invention is not limited thereto, and other shapes such as a round shape may be employed.

The pressure sensitive sensor 20 is provided with an upper film 21 having a rectangular frame shape and exemplifying a second substrate, and a lower film 22 having a rectangular frame shape and exemplifying a first substrate disposed to be opposed to the upper film 21. The lower film 22 is bonded onto the rectangular frame portion 2b of the display window 2A by, for example, a sticky agent (not shown), so that the pressure sensitive sensor 20 is attached to the display window 2A. The thickness of each of the upper and lower films 21 and 22 is set to, for example, 25 µm to 100 µm.

As the materials for the upper and lower films 21 and 22, the may be used materials applicable to a flexible substrate, for example, general purpose resins such as polyethylene terephthalate, polystyrene resin, polyolefin resin, ABS resin, AS resin, acrylic resin, and AN resin. Alternatively, as the materials for the upper and lower films 21 and 22, there may be used general purpose engineering resins such as polystyrene resin, polycarbonate resin, polyacetal resin, polycarbonate-modified polyphenylene ether resin, polybutylene terephthalate resin, and ultra-high molecular polyethylene resins, or super engineering resins such as polysulfone resin, polyphenylene sulfide resin, polyphenylene oxide resin, polyallylate resin, polyether imide resin, polyimide resin, liquid crystal polyester resin, and polyallyl heat-resistant resins.

An upper electrode 21a having a rectangular frame shape is disposed on the surface of the upper film 21 opposed to the lower film 22. On the surface of the lower film 22 opposed to the upper film 21, the lower electrode 22a having a rectangular frame shape is disposed so as to face the upper electrode 21a. In this case, a pair of electrodes are configured by the upper electrode 21a and the lower electrode 22a. The thickness of each of the upper and lower electrodes 21a and 22a is set to, for example, 10 µm to 20 µm.

As the materials for the upper and lower electrodes 21a and 22a, there may be used metals such as gold, silver, copper, or nickel, or a conductive paste such as carbon. As the formation method therefor, for example, used are a printing method such as a screen printing method, an offset printing method, a gravure printing method, or a flexographic printing method, a photoresist method, or the like. Alternatively, the upper and lower electrodes 21a and 22a may be formed by attaching a metal foil of copper, or gold, or the like. Further alternatively, the upper and lower electrodes 21a and 22a may be formed through processes in which, on an FPC (flexible circuit substrate) plated thereon with metal such as copper, an electrode pattern is formed by resist, and the metal foil on portions not protected by the resist is etched.

On four corner portions 121 of the upper film 21, upper pressure sensitive ink members 23a each having a dot shape are disposed so as to cover the upper electrode 21a. On four corner portions 122 of the lower film 22, lower pressure sensitive ink members 23b each having a dot shape are disposed so as to cover the lower electrode 22a and to be opposed to the upper pressure sensitive ink members 23a. The thickness (the height from the upper film 21 or the lower film 22) of each of the upper and lower pressure sensitive ink members 23a and 23b is set to be greater than the thickness of the upper or lower electrode 21a or 22a, namely, for example, to 15 µm to 35 µm. The dot shape of the upper or lower pressure sensitive ink member 23a or 23b is not particularly limited, but may be formed into a round, rectangular, or triangular shape. The following description will be given by exemplifying the upper or lower pressure sensitive ink member 23a or 23b having a round shape.

The composition for forming the upper and lower pressure sensitive ink members 23a and 23b is made of a conductive material of which electric characteristic such as an electric resistance value is varied depending on an external force. More specifically, the upper and lower pressure sensitive ink members 23a and 23b are designed such that, among a plurality of pressure sensitive particles adjacent to one another, which correspond to many conductive particles contained in the composition, a tunnel current is allowed to flow in response to an application of a pressure regardless of the presence or absence of a direct contact thereamong, so as to be changed from an insulating state into a conductive state. As such a composition, for example, a Quantum Tunneling Composite, which is available as a trade name "QTC" from Peratech Ltd. in Darlington, England, may be used. The upper pressure sensitive ink member 23*a* and the lower pressure sensitive ink member 23*b* are disposed on the upper film 21 and the lower film 22 by a coating process. As the coating methods of the upper and lower pressure sensitive ink members 23*a* and 23*b*, there may be each used a printing method, such as a screen printing method, an offset printing method, a gravure printing method, or a flexographic printing method.

Figure 10:
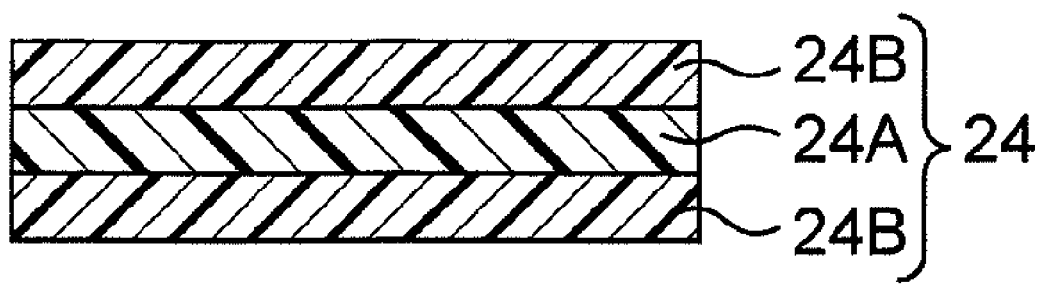
FIG. 10 is a cross-sectional view that shows a gap retaining member.

On an opposing area between the upper film 21 and the lower film 22, a gap retaining member 24 having a rectangular frame shape is disposed. The gap retaining member 24 has such a sticking property that the upper film 21 and the lower film 22 are bonded to each other, and serves as an insulating member used for retaining a gap 31 between the opposed surfaces of the upper pressure sensitive ink members 23*a* and the lower pressure sensitive ink members 23*b*. The gap retaining member 24 is prepared as, for example, a double-sided sticky tape having a core material 24A such as a polyethylene terephthalate film, on both of the surfaces of which a sticky agent 24B such as an acrylic adhesive paste, is formed, as shown in FIG. 10. The thickness of the gap retaining member 24 is set to, for example, 50 µm to 100 µm.

As shown in FIG. 9, in four corner portions of the gap retaining member 24, through holes 24*a* each having a round shape are formed. Each of the through holes 24*a* is formed with a diameter larger than that of the round upper and lower pressure sensitive ink members 23*a* and 23*b*. For example, the diameter of the through hole 24*a* is 3 mm, the diameters of the upper and lower pressure sensitive ink members 23*a* and 23*b* are 2 mm, and the width of the upper and lower electrodes 21*a* and 22*a* in the rectangular frame shape is 1 mm. In this configuration, the gap retaining member 24 and the pressure sensitive ink members 23*a*, 23*b* are prevented from being made in contact with each other. Moreover, since the gap retaining member 24 covers the upper and lower electrodes 21*a* and 22*a* on portions other than the through holes 24*a*, it is possible to prevent the two electrodes 21*a* and 22*a* from becoming conductive to each other on portions other than the portions corresponding to the through holes 24*a*.

The upper and lower electrodes 21*a* and 22*a* are connected to a connector 25. The connector 25 is connected to a pressing force detection unit 6 that is built in the portable telephone 1.

Figure 11:
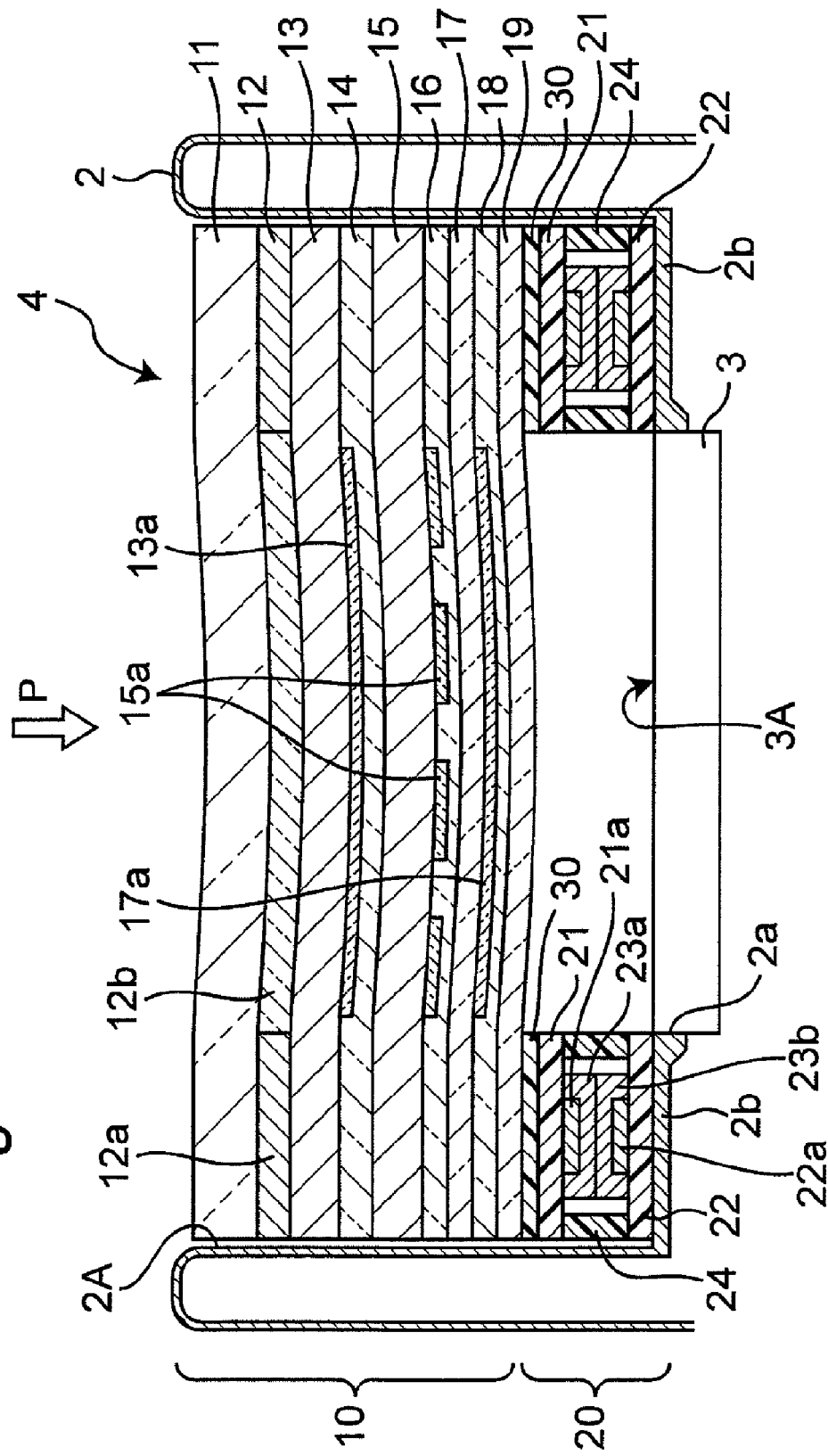
FIG. 11 is a cross-sectional view that schematically shows a state in which a pressing force is applied to the touch input device shown in FIG. 2.

As shown in FIG. 2, in a normal state (with no pressure applied thereto), the pressure sensitive sensor 20 having the above-mentioned structure is in a state in which the upper pressure sensitive ink member 23*a* and the lower pressure sensitive ink member 23*b* are not made in contact with each other by the gap retaining member 24. In this state, when a pressing force P is applied to the touch input surface of the touch panel main body 10 disposed on the pressure sensitive sensor 20, the upper or lower film 21 or 22 is, for example, warped to be deformed by the pressing force P, as shown in FIG. 11. Thus, at least the upper and lower pressure sensitive ink members 23*a* and 23*b* closest to the portion subjected to the pressing force P are made in contact with each other, with a result that an electric current is allowed to flow between the upper electrode 21*a* and the lower electrode 22*a*. The pressing force detection unit 6 detects this electric current, so that the pressing force P can be detected.

As the pressing force P becomes greater, the external force applied to the upper and lower pressure sensitive ink members 23*a* and 23*b* increases, with a result that the electric resistance values of the upper and lower pressure sensitive ink members 23*a* and 23*b* become smaller. Thus, the electric current flowing between the upper electrode 21*a* and the lower electrode 22*a* increases. This change in electric current is converted into a voltage value and detected by the pressing force detection unit 6, so that the external force applied to the upper or lower pressure sensitive ink member 23*a* or 23*b* can be detected by the pressing force detection unit 6, and the pressing force P can be therefore detected.

In the touch input device 4 in accordance with the first embodiment of the present invention, since each of the upper and lower electrodes 21*a* and 22*a* are disposed in the form of the frame, the transmittance of the inner portion surrounded by the frame is not lowered. Therefore, even when mounted in the portable telephone 1, degradation of visibility of the display portion 3A can be prevented by disposing the display portion 3A of the display device 3 on the inner side of the frame. Moreover, since the pressure sensitive ink members 23*a* and 23*b* are located on the respective corner portions 121 and 122 of the upper and lower films 21 and 22 in a scattered manner, it is possible to suppress deviations of the area where the upper or lower pressure sensitive ink member 23*a* or 23*b* is made in contact with both of the upper and lower electrodes 21*a* and 22*a* when an equal pressing force is applied to the upper film 21. Therefore, it becomes possible to improve the pressure measuring precision.

Figure 12:
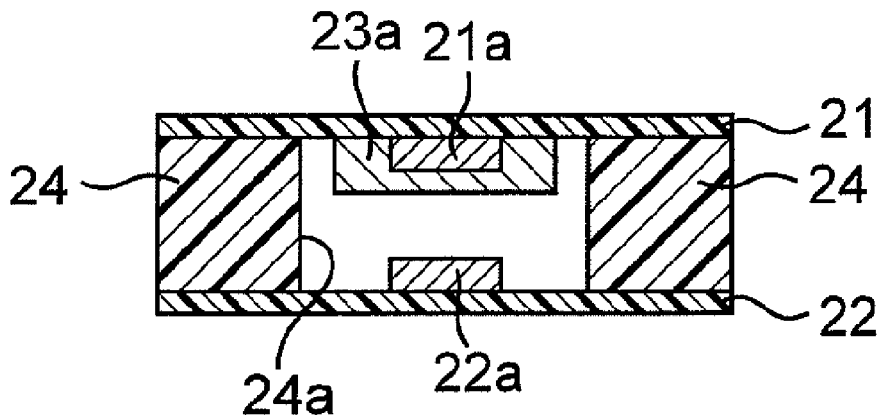
FIG. 12 is a cross-sectional view that shows a first modified example of the pressure sensitive sensor provided in the touch input device in accordance with the first embodiment of the present invention.

The present invention is not intended to be limited to the above-mentioned embodiment, and may be applied in other various modes. For example, in the first embodiment, both of the upper and lower electrodes 21*a* and 22*a* are covered with the upper and lower pressure sensitive ink members 23*a* and 23*b*; however, the present invention is not intended to be limited to this structure. For example, as shown in FIG. 12, the upper electrode 21*a* may be covered with the upper pressure sensitive ink member 23*a*, while the lower electrode 22*a* is not covered with the lower pressure sensitive ink member 23*b*. In other words, at least either one of the upper and lower electrodes 21*a* and 22*a* may be covered with the pressure sensitive ink member. In this case, since only one pressure sensitive ink member is disposed between the upper electrode 21*a* and the lower electrode 22*a*, the pressure measuring precision becomes higher in comparison with the structure in which the two pressure sensitive ink members are disposed. As shown in the first embodiment, in the case where both of the upper and lower electrodes 21*a* and 22*a* are covered with the upper and lower pressure sensitive ink members 23*a* and 23*b*, it is possible to reduce portions of the upper and lower electrodes 21*a* and 22*a* exposed to the inner spaces of the through holes 24*a*. In this structure, it is possible to suppress problems such as corrosion of the upper and lower electrodes 21*a* and 22*a*.

Figure 13:
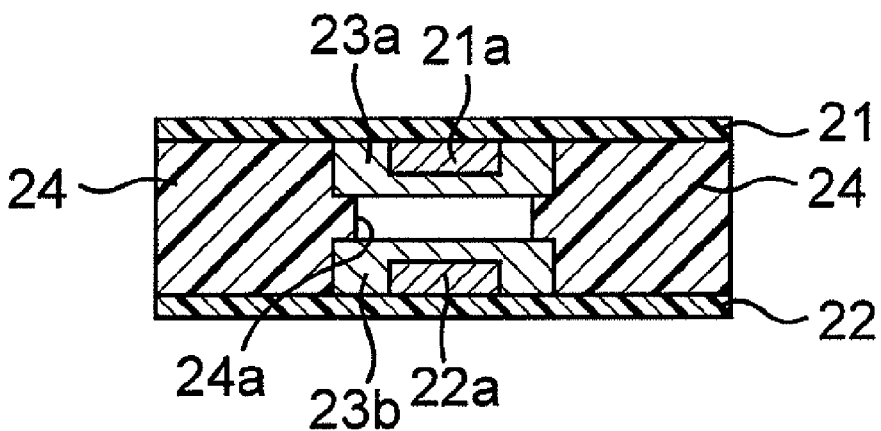
FIG. 13 is a cross-sectional view that shows a second modified example of the pressure sensitive sensor provided in the touch input device in accordance with the first embodiment of the present invention.

In the first embodiment, the diameter of each of the through holes 24*a* of the gap retaining member 24 is made greater than the diameter of each of the upper and lower pressure sensitive ink members 23*a* and 23*b*; however, as shown in FIG. 13, the diameter thereof may be made smaller than that of the upper and lower pressure sensitive ink members 23*a* and 23*b*. More specifically, the gap retaining member 24 may made in contact with the periphery of each of the upper and lower pressure sensitive ink members 23*a* and 23*b* without any gap therebetween. In this configuration, it is possible to eliminate portions of the upper and lower electrodes 21*a* and 22*a* not covered with any one of the upper and lower pressure sensitive ink members 23*a* and 23*b* and the gap retaining member 24. In other words, it is possible to prevent the upper and lower electrodes 21a and 22a from being exposed to the inner spaces of the through holes 24a. In this structure, it is possible to suppress problems such as corrosion of the upper and lower electrodes 21a and 22a.

Figure 14:
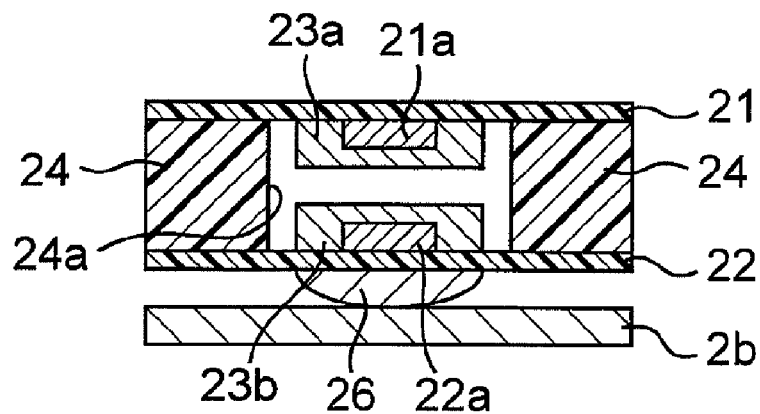
FIG. 14 is a cross-sectional view that shows a third modified example of the pressure sensitive sensor provided in the touch input device in accordance with the first embodiment of the present invention.
Figure 15:
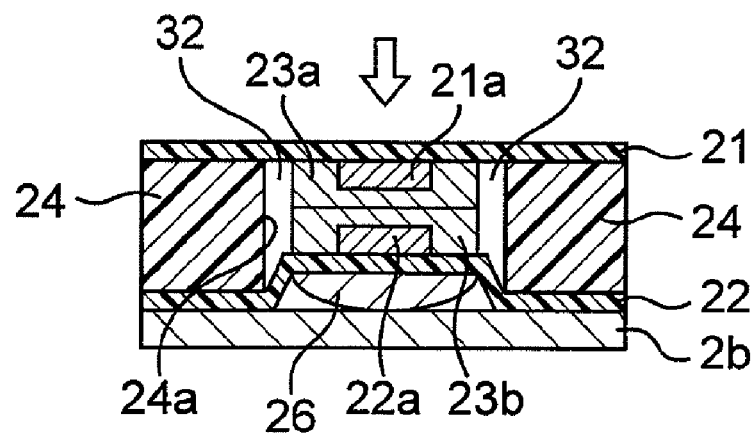
FIG. 15 is a cross-sectional view that shows a state in which a pressing force in a thickness direction is applied to the pressure sensitive sensor in accordance with the third modified example of FIG. 14.

Moreover, as shown in FIG. 14, on the surface (rear surface) where the lower electrode 22a of the lower film 22 is not formed, a bump 26 may be laminated and disposed as a supporting member. In this case, the height of the bump 26 is set to, for example, 5 μm to 1000 μm, more specifically, 50 μm to 200 μm (including the thickness of an adhesive layer used for bonding the lower film 22). In this structure, as shown in FIG. 15, upon application of a pressing force in the thickness direction to the pressure sensitive sensor 20, the portion of the pressure sensitive ink member 23b of the lower film 22 can be supported from below, so that the applied pressing force can be positively transmitted as a force to be utilized for deforming the lower film 22, without being scattered. In this structure, it is possible to improve the pressure measuring precision.

The bump 26 is preferably designed to have such rigidity as not to be deformed even when the touch panel main body 10 is pressed with a force of, for example, 1 kg. The bump 26 may be prepared as an insulating member or a conductive member. The bump 26 may be formed of, for example, a thermosetting resin, an ultraviolet-cured resin, or a foamed material such as polyethylene foam or urethane foam. The width of the bump 26 is preferably set to 0.1 mm or more. In a case where the width of the bump 26 is less than 0.1 mm, there is a possibility of failure to sufficiently deform the lower film 22. Moreover, the width of the bump 26 is preferably set to equal to or less than the width of the pressure sensitive sensor 20. In a case where the width of the bump 26 is larger than the width of the pressure sensitive sensor 20, the bump 26 may be made in contact with a portion other than the pressure sensitive sensor 20 to cause degradation of the pressure measuring precision.

Moreover, the bump 26 is preferably disposed on the rear surface side (right below) of the position where the pressure sensitive ink member 23b is disposed. In this structure, the upper and lower pressure sensitive ink members 23a and 23b can be more positively made in contact with each other so that the pressure measuring precision can be further improved. As shown in FIG. 15, the structure (provided with the gap 32) in which the gap retaining member 24 is not made in contact with the upper or lower pressure sensitive ink member 23a or 23b allows the lower film 22 to be more easily deformed, making it possible to further improve the pressure measuring precision.

The supporting member is not intended to be limited to the bump 26, by any member may be used as long as it has a high compressive characteristic. Moreover, a member having a semi-spherical shape, such as the bump 26, is more effectively used for transmitting a pressing force. Furthermore, in the above description, the supporting member is provided on the rear surface of the lower film 22; however, this may be provided on the rear surface (upper surface) of the upper film 21. The upper or lower film 21 or 22, which is provided with the supporting member, preferably has flexibility.

Moreover, in the first embodiment, the upper or lower pressure sensitive ink member 23a or 23b is disposed on each of the corner portions 121 and 122 of the upper or lower film 21 or 22; however, the present invention is not intended to be limited thereto. It is only necessary for the upper or lower pressure sensitive ink member 23a or 23b to be disposed along the edge portion of the upper or lower film 21 or 22 in a scattered manner.

In the first embodiment, the decorative film 12 is provided; however, the decorative film 12 is not necessarily required.

Second Embodiment

Figure 16:
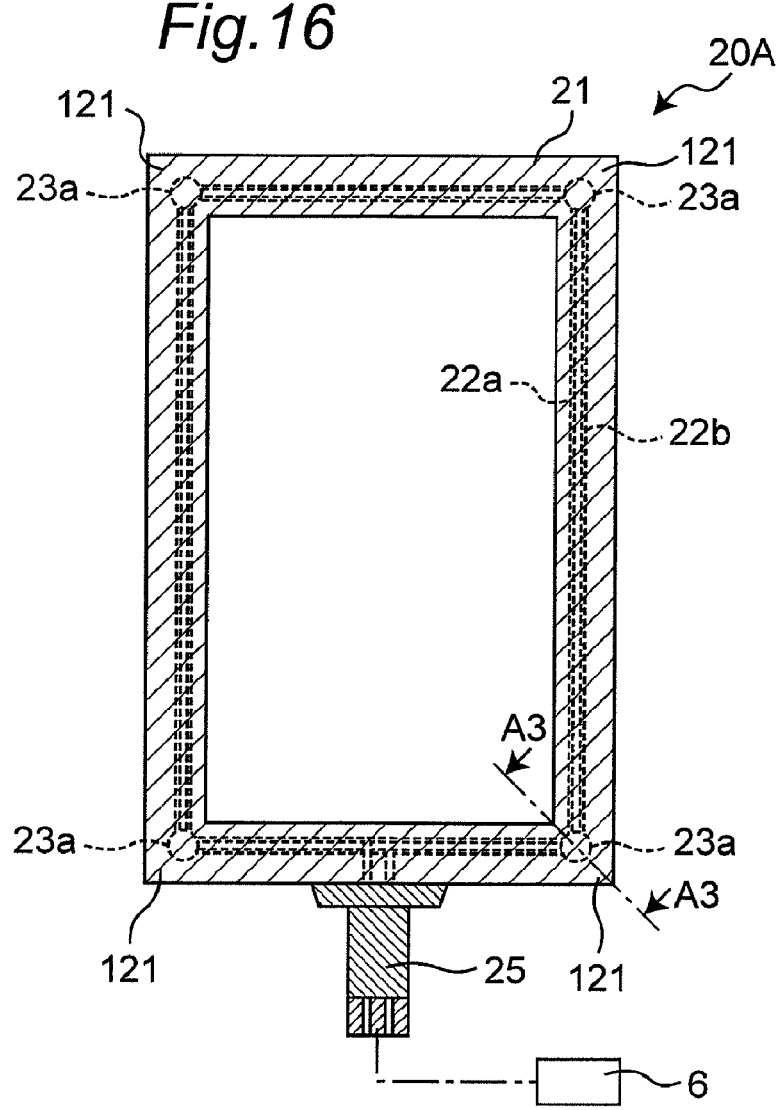
FIG. 16 is a plan view that shows a pressure sensitive sensor provided in a touch input device in accordance with a second embodiment of the present invention.
Figure 17:
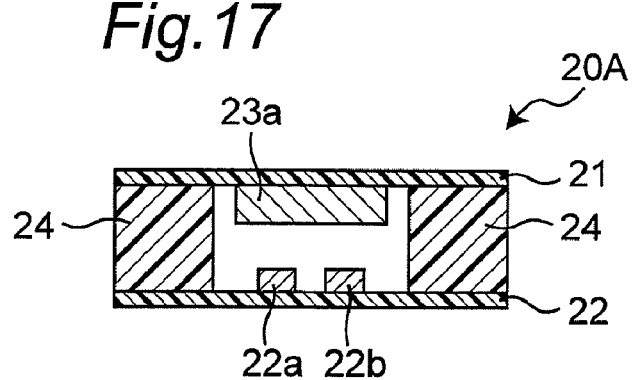
FIG. 17 is a cross-sectional view taken along line A3-A3 in FIG. 16.
Figure 18:
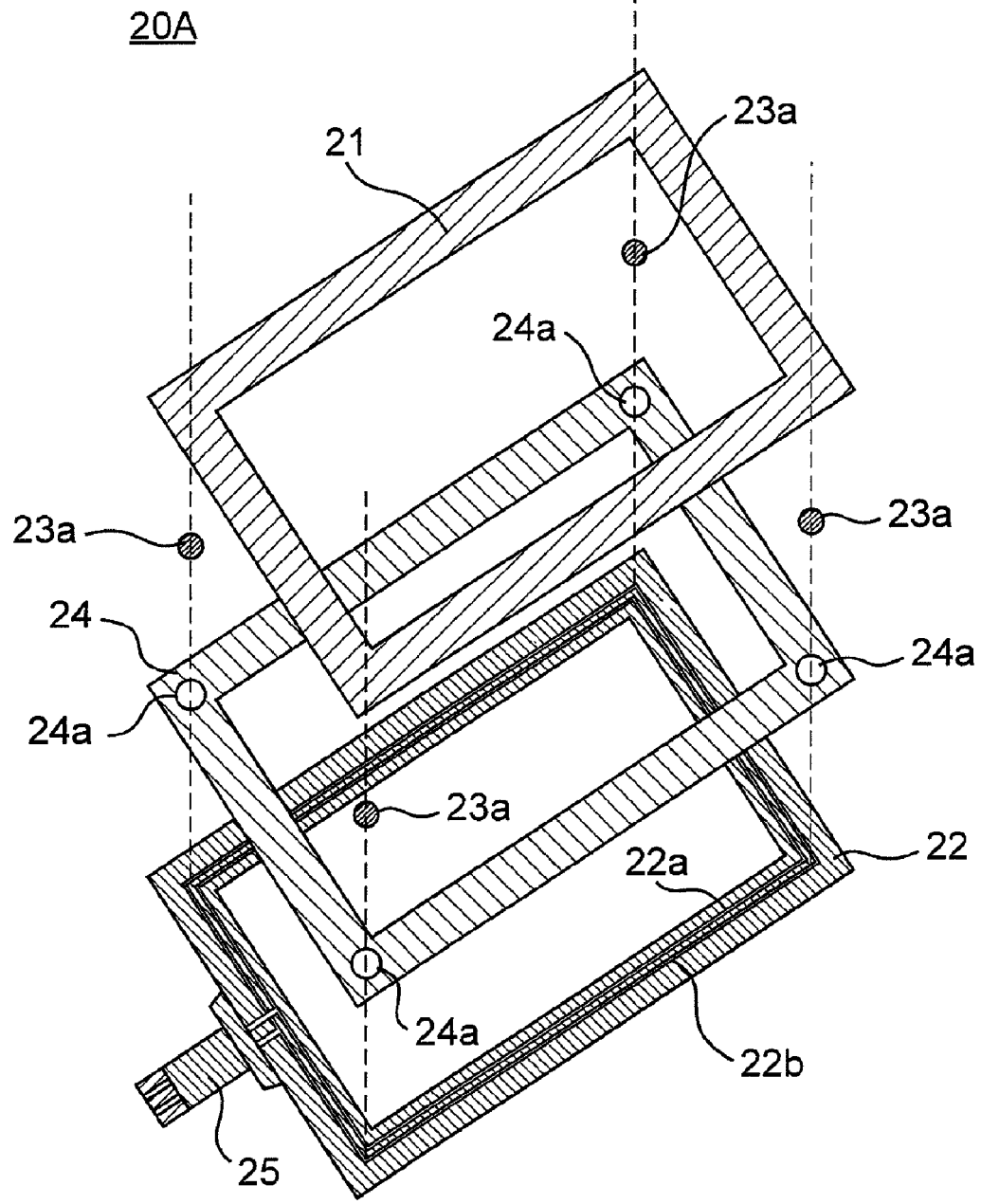
FIG. 18 is an exploded perspective view that shows the pressure sensor shown in FIG. 16.

FIG. 16 is a plan view that shows a pressure sensitive sensor 20A included in a tough input device in accordance with a second embodiment of the present invention, and FIG. 17 is a cross-sectional view taken along line A3-A3 in FIG. 16. FIG. 18 is an exploded perspective view that shows the pressure sensitive sensor 20A shown in FIG. 16. The touch input device in accordance with the second embodiment is different from the touch input device of the first embodiment in that, in place of the upper electrode 21a, a lower electrode 22b having a rectangular frame shape is disposed on the lower film 22 in parallel with the lower electrode 22a. That is, paired electrodes in the rectangular frame shape are disposed on the lower film 22 with a predetermined gap therebetween so that the inner electrode in the rectangular frame shape corresponds to the lower electrode 22a of the first embodiment and the outer electrode in the rectangular frame shape corresponds to the upper electrode 21a of the first embodiment. Therefore, in this case, the pair of electrodes are formed by the first lower electrode 22a and the second lower electrode 22b that are formed on the lower film 22.

In accordance with the touch input device of the second embodiment, upon application of a pressing force on the pressure sensitive sensor 20A in the thickness direction, at least one of the four upper pressure sensitive ink members 23a disposed on the corner portions 121 of the upper film 21 is made in contact with both of the first lower electrode 22a and the second lower electrode 22b so as to make the two electrodes conductive to each other. Thus, the external force to be applied to the pressure sensitive ink member 23a can be detected so that the pressing force applied to the touch input surface can be detected.

Third Embodiment

Figure 19:
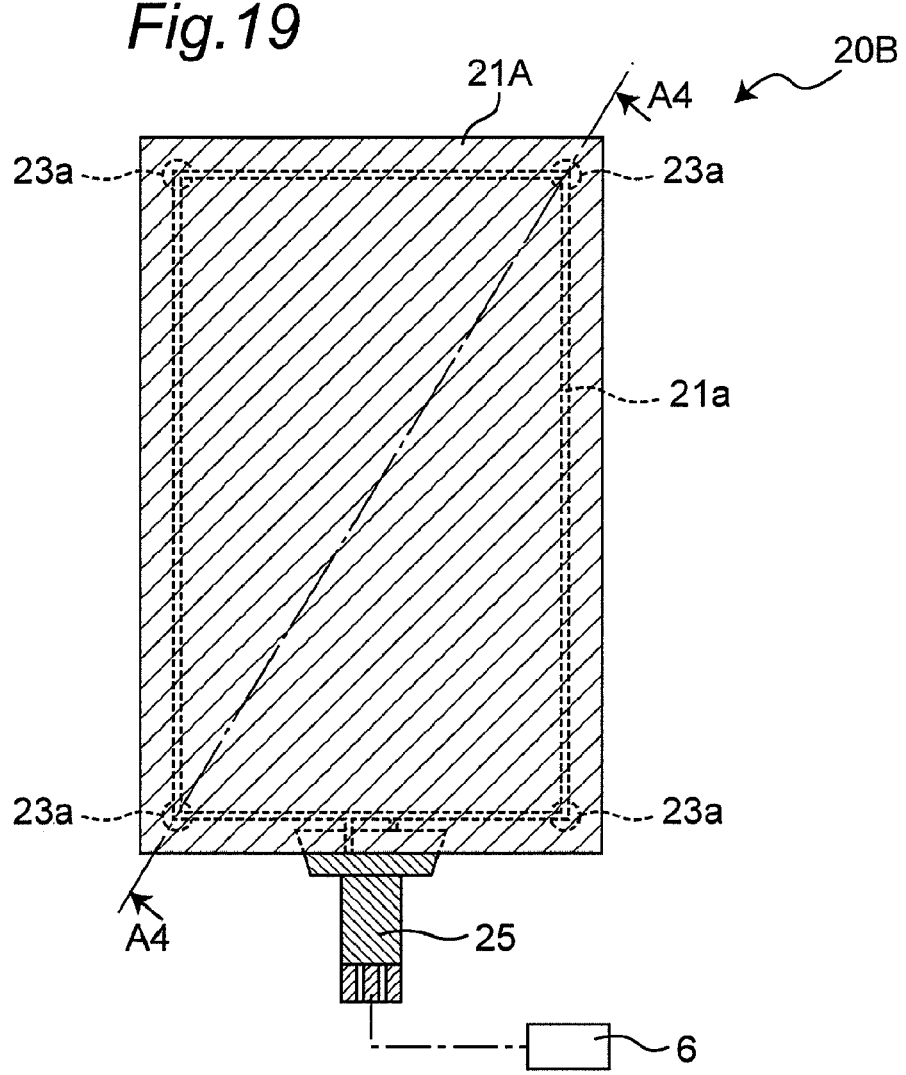
FIG. 19 is a plan view that shows a pressure sensitive sensor provided in a touch input device in accordance with a third embodiment of the present invention.
Figure 20:
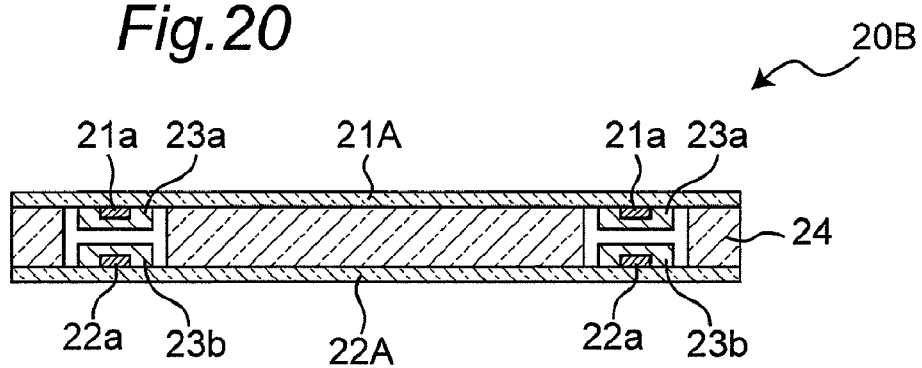
FIG. 20 is a cross-sectional view taken along line A4-A4 in FIG. 19.

FIG. 19 is a plan view that shows a pressure sensitive sensor 20B included in a tough input device in accordance with a third embodiment of the present invention, and FIG. 20 is a cross-sectional view taken along line A1-A1 in FIG. 19. The touch input device in accordance with the third embodiment is different from the touch input device of the first embodiment in that, in place of the upper and lower films 21 and 22 in the rectangular frame shapes, upper and lower films 21A and 22A in rectangular sheet shapes are provided therein. Moreover, in the touch input device in accordance with the third embodiment, the upper and lower films 21A and 22A and the gap retaining member 24 are made of transparent materials.

In accordance with the touch input device of the third embodiment, since each of the upper and lower electrodes 21a and 22a is disposed in the rectangular frame shape so that the transmittance of the inner portion surrounded by the rectangular frame is not lowered. Moreover, since the upper and lower films 21A and 22A and the gap retaining member 24 are made of the transparent materials, it is possible to suppress degradation of transmittance. Therefore, even when mounted in the portable telephone 1, it is possible to suppress degradation of visibility of the display unit 3A of the display device 3.

Fourth Embodiment

Figure 21:
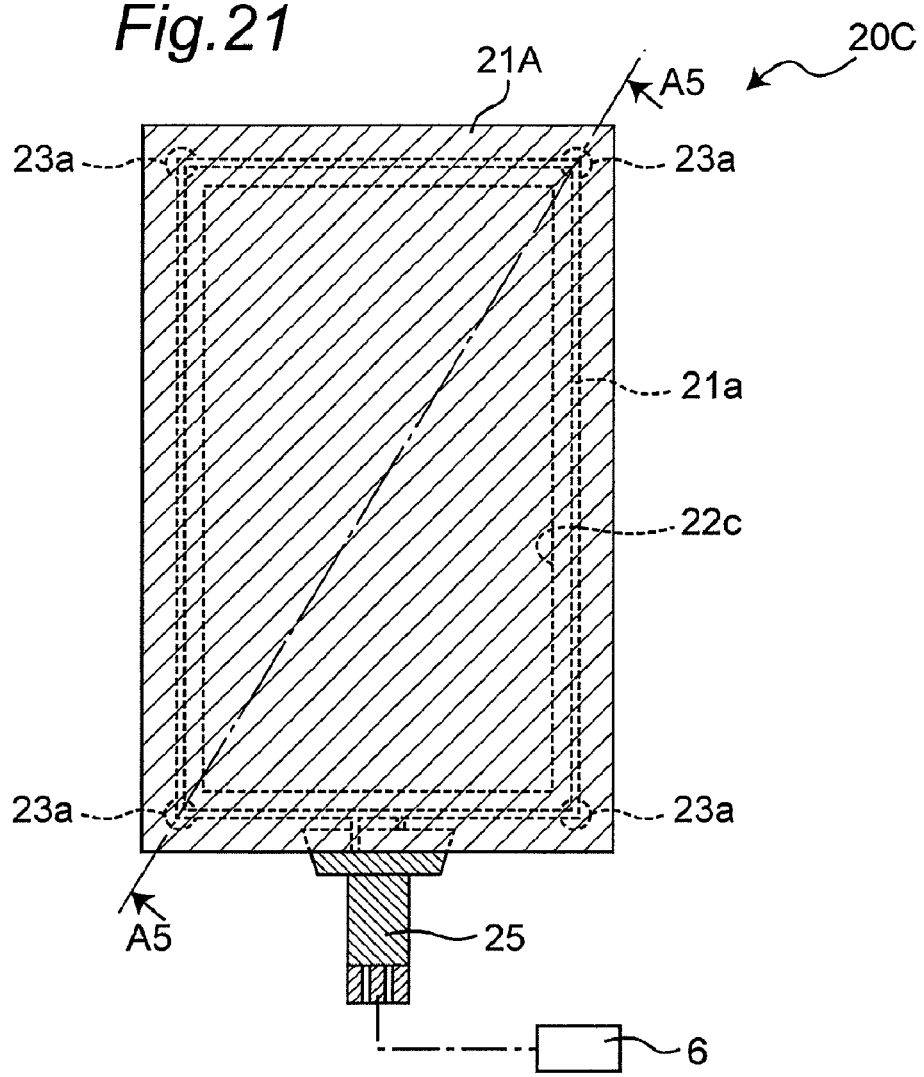
FIG. 21 is a plan view that shows a pressure sensitive sensor provided in a touch input device in accordance with a fourth embodiment of the present invention.
Figure 22:
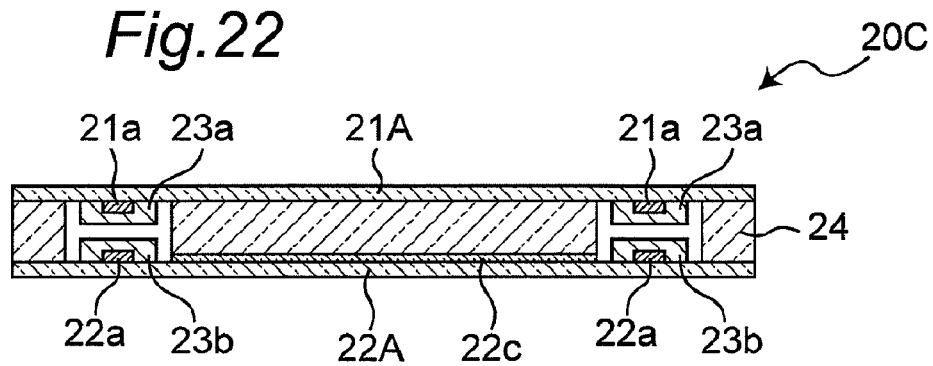
FIG. 22 is a cross-sectional view taken along line A5-A5 in FIG. 21.

FIG. 21 is a plan view that shows a pressure sensitive sensor 20C included in a tough input device in accordance with a fourth embodiment of the present invention, and FIG. 22 is a cross-sectional view taken along line A5-A5 in FIG. 21. The touch input device in accordance with the fourth embodiment is different from the touch input device of the third embodiment in that a shielding transparent electrode 22c serving as one example of a transparent electromagnetic shielding member is provided between the lower film 22A and the gap retaining member 24. This shielding transparent electrode 22c is made of the same material with the same shape and the same size as those of the shielding transparent electrode 17a described in the first embodiment, and is connected to a lead-out circuit (not shown) that is similar to the lead-out circuit 17b.

In accordance with the touch input device of the fourth embodiment, since the shielding transparent electrode 22c is provided, the shielding transparent electrode 17a needs not be provided in the touch panel 10. In this structure, the transmittance of the inner portion of the upper and lower electrodes 21a and 22a is not lowered as the entire touch input device. Therefore, even when mounted in the portable telephone 1, it is possible to suppress degradation of visibility of the display unit 3A of the display device 3.

Fifth Embodiment

Figure 23:
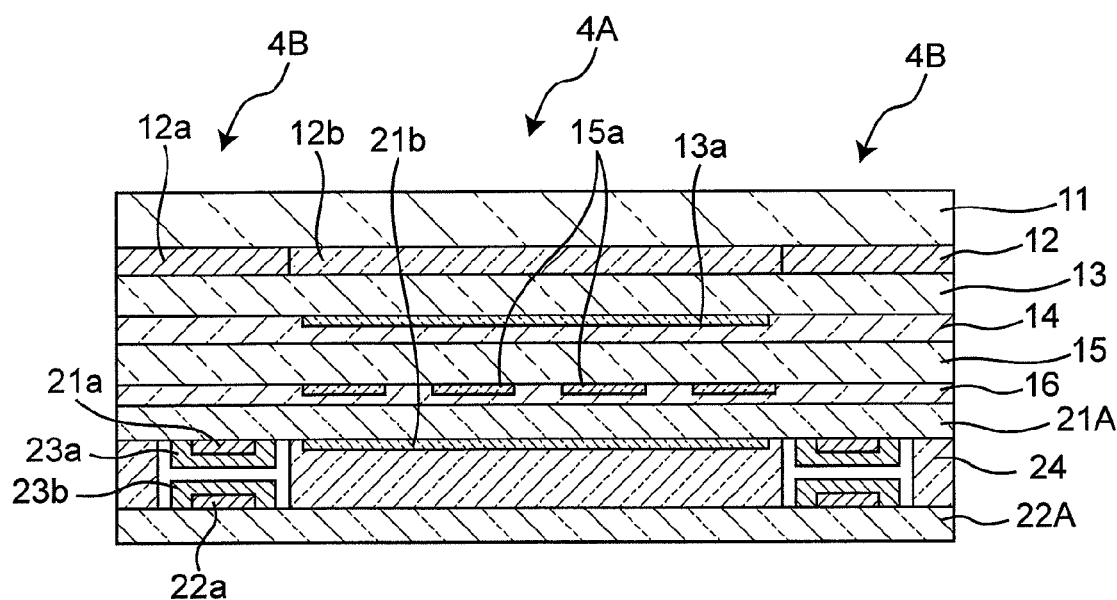
FIG. 23 is a cross-sectional view that shows a touch input device in accordance with a fifth embodiment of the present invention.

FIG. 23 is a cross-sectional view that shows a touch input device in accordance with a fifth embodiment of the present invention. The touch input device in accordance with the fifth embodiment is different from the touch input device of the third embodiment in that a shielding transparent electrode 21b is provided between the upper film 21A and the gap retaining member 24, and in that the lower film 22A is made of the material same as that of the hard coat film 19, with none of the shielding transparent film 17, the transparent sticky layer 18, and the hard coat film 19 being provided. That is, the upper film 21A is allowed to have the function of the shielding transparent film 17, and the lower film 22A is allowed to have the function of the hard coat film 19.

Figure 24:
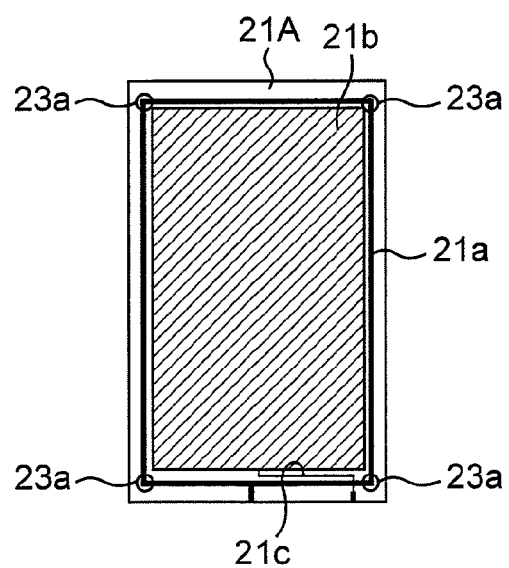
FIG. 24 is a plan view that shows an upper film provided in the touch input device in accordance with the fifth embodiment of the present invention.

FIG. 24 is a plan view that shows the upper film 21A included in the touch input device in accordance with the fifth embodiment of the present invention. The shielding transparent electrode 21b is made of the same material with the same shape and the same size as those of the shielding transparent electrode 17a described in the first embodiment, and is connected to a lead-out circuit 21c that is formed in a manner similar to the lead-out circuit 17b. In this case, the lead-out circuit 21c and the upper electrode 21a are made so as not to contact each other, with, for example, an insulating member being disposed between these two members.

In accordance with the touch input device of the fifth embodiment, since the shielding transparent film 17, the transparent sticky layer 18, and the hard coat film 19 are not provided, the transmittance of the transparent window portion 4A can be improved in comparison with that of the touch input device in accordance with the third embodiment. Moreover, it is possible to reduce cost and also to improve the efficiency of manufacturing processes. Moreover, since the touch panel main body is made thinner, the sensitivity of the pressure sensitive sensor can be improved.

Sixth Embodiment

Figure 25:
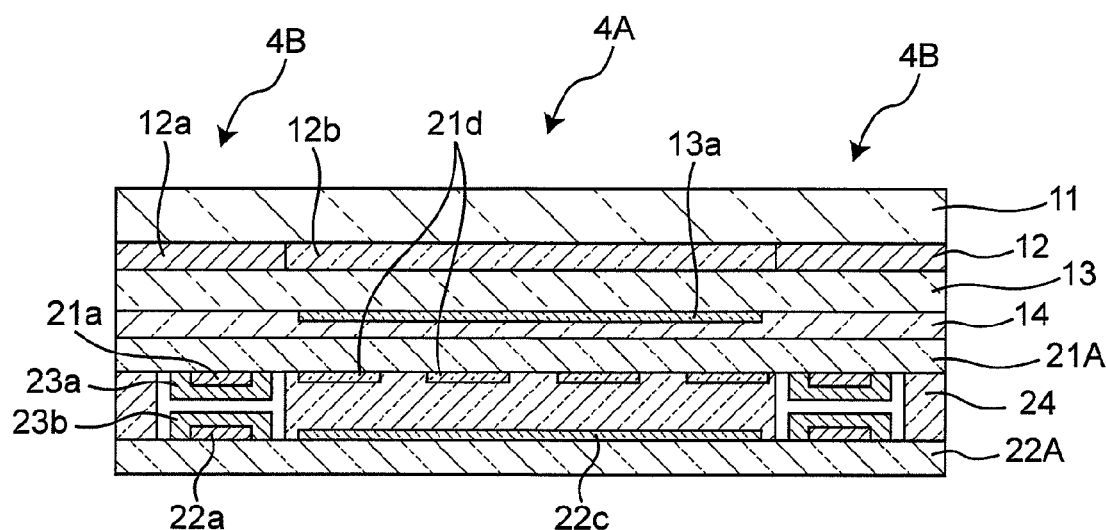
FIG. 25 is a cross-sectional view that shows a touch input device in accordance with a sixth embodiment of the present invention.

FIG. 25 is a cross-sectional view that shows a touch input device in accordance with a sixth embodiment of the present invention. The touch input device in accordance with the sixth embodiment is different from the touch input device of the fourth embodiment in that a lower transparent electrode 22c is provided between the upper film 22A and the gap retaining member 24, and in that the lower film 22A is made of a material similar to that of the hard coat film 19, with none of the Y-coordinate detecting transparent film 15, the transparent sticky layer 16, the shielding transparent film 17, the transparent sticky layer 18, and the hard coat film 19 being provided. That is, the upper and lower films 21A and 22A are allowed to have the functions of the Y-coordinate detecting transparent film 15, the shielding transparent film 17, and the hard coat film 19. In this case, the X-coordinate detecting transparent film 13 serves as one example of the third substrate.

Figure 26:
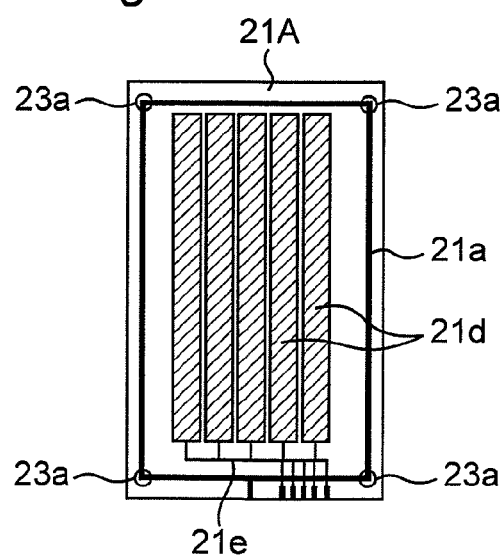
FIG. 26 is a plan view that shows an upper electrode film provided in the touch input device in accordance with the sixth embodiment of the present invention.

FIG. 26 is a plan view that shows the upper film 21A included in the touch input device in accordance with the sixth embodiment of the present invention. A lower transparent electrode 21d is made of the same material with the same shape and the same size as those of the lower transparent electrode 15a described in the first embodiment, and is connected to a lead-out circuit 21e that is formed in a manner similar to the lead-out circuit 15b. In this case, the lead-out circuit 21e and the upper electrode 21a are made so as not to contact each other, with, for example, an insulating member being disposed between these two members.

In accordance with the touch input device of the sixth embodiment, since none of the Y-coordinate detecting transparent film 15, the transparent sticky layer 16, the shielding transparent film 17, the transparent sticky layer 18, and the hard coat film 19 are provided, the transmittance of the transparent window portion 4A can be improved in comparison with that of the touch input device in accordance with the fourth embodiment. Moreover, it is possible to reduce cost and also to improve the efficiency of manufacturing processes. Moreover, since the touch panel main body is made thinner, the sensitivity of the pressure sensitive sensor can be improved.

Seventh Embodiment

Each of the embodiments has been described above by exemplifying a touch panel in which electrodes are respectively formed on two films so as to detect plane coordinates; however, for example, in a case of a simple structure in which determination of the Y-coordinate subsequently determines the X-coordinate, the plane coordinates can be detected by forming the electrodes on one film. For this reason, a touch input device in accordance with a seventh embodiment of the present invention has the following structure.

Figure 27:
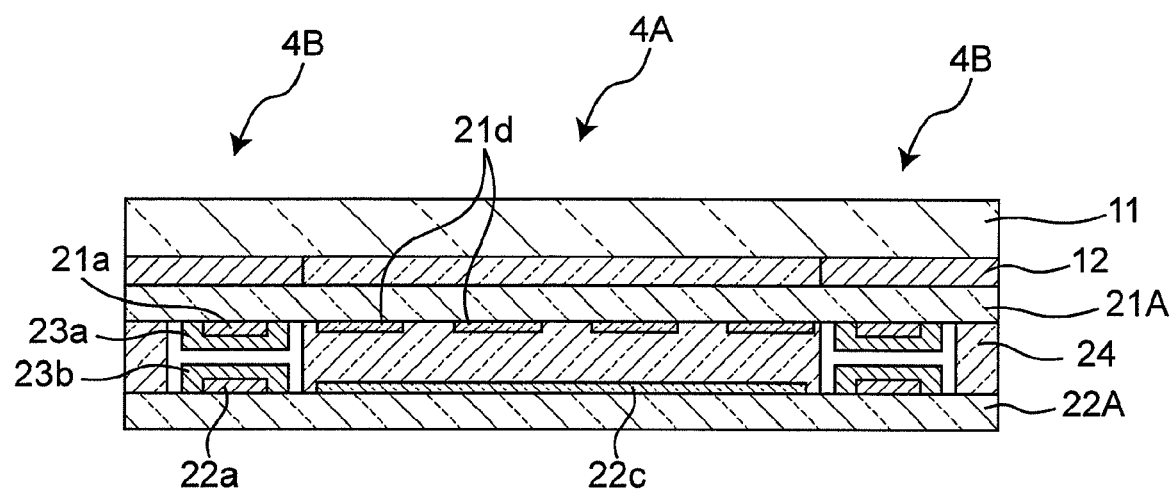
FIG. 27 is a cross-sectional view that shows a touch input device in accordance with a seventh embodiment of the present invention.

FIG. 27 is a cross-sectional view that shows the touch input device in accordance with the seventh embodiment of the present invention. The touch input device in accordance with the seventh embodiment is different from the touch input device of the sixth embodiment in that the X-coordinate detecting transparent film 13 and the transparent sticky layer 14 are not provided.

In the touch input device in accordance with the seventh embodiment, since the X-coordinate detecting transparent film 13 and the transparent sticky layer 14 are not provided, the transmittance of the transparent window portion 4A can be improved in comparison with the touch input device of the sixth embodiment. Moreover, it is possible to reduce cost and also to further improve the efficiency of manufacturing processes. Since the touch panel main body is made thinner, the sensitivity of the pressure sensitive sensor can be improved.

Eighth Embodiment

Figure 28:
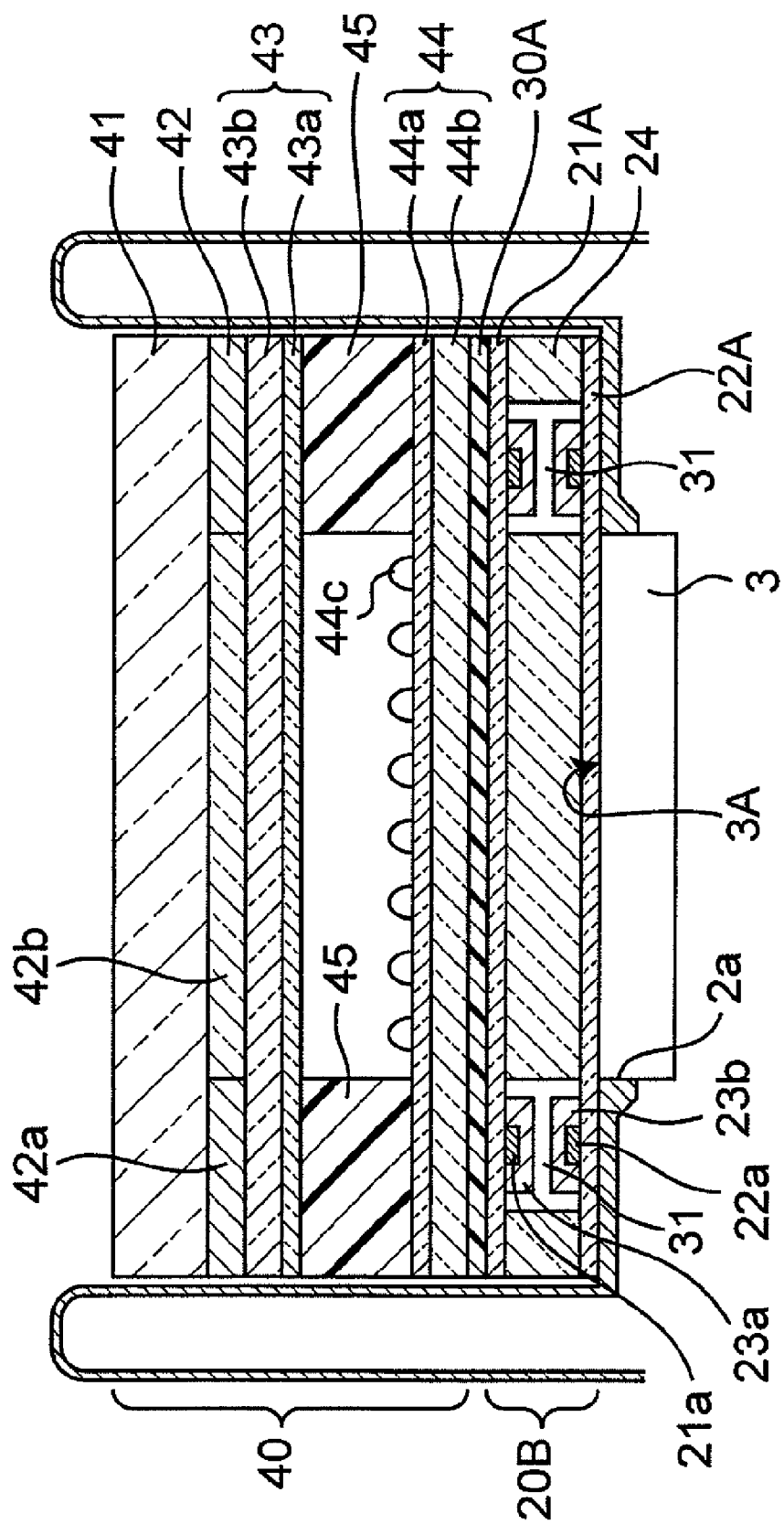
FIG. 28 is a cross-sectional view that shows a touch input device in accordance with an eighth embodiment of the present invention.

FIG. 28 is a cross-sectional view that shows a touch input device in accordance with an eighth embodiment of the present invention. The touch input device in accordance with the eighth embodiment is different from the touch input device of the third embodiment in that, in place of the touch panel main body 10 of the electrostatic capacity type, a touch panel main body 40 of a resistance film type is included. The touch panel main body 40 and a pressure sensitive sensor 20B are bonded to each other by a transparent sticky layer 30A (with a thickness of 50 μm, for example).

The touch panel main body 40 has a structure in which a transparent hard coat film 41, a decorative film 42, an upper electrode film 43, and a lower electrode film 44 are stacked in this order.

The hard coat film 41 is a transparent film member that configures an input surface of the touch input device. A material superior in transparency as well as in anti-abrasion property is preferably used as the material for the hard coat film 41. Examples of such a material include: general purpose resins such as polyethylene terephthalate, polystyrene resin, polyolefin resin, ABS resin, AS resin, acrylic resin, and AN resin. Moreover, as the material for the hard coat film 41, there may be used a general purpose engineering resin such as polystyrene resin, polycarbonate resin, polyacetal resin, polycarbonate-modified polyphenylene ether resin, polybutylene terephthalate resin, or an ultra-high molecular polyethylene resin, or a super engineering resin such as polysulfone resin, polyphenylene sulfide resin, polyphenylene oxide resin, polyallylate resin, polyether imide resin, polyimide resin, liquid crystal polyester resin, or a polyallyl heat-resistant resin.

As the hard coat film 41, any non-color transparent and colored transparent films may be used as long as they are transparent. The decorative film 42 is bonded to the lower surface of the hard coat film 41 by a transparent sticky agent (not shown).

The decorative film 42 is formed by applying ink onto the peripheral surface of a transparent film used for the decorative film into the form of a rectangular frame. The rectangular decorative area 4B (see FIG. 3) is formed by a decorative portion 42a in a rectangular frame shape corresponding to the portion having the ink applied thereto, and a rectangular portion 42b with no decorative portion 42a being formed thereon serves as a transparent window portion 4A (see FIG. 3).

As the ink forming the decorative portion 42a, there may be used a coloring ink, which contains as a binder a resin such as polyvinyl chloride resin, polyamide resin, polyester resin, polyacrylic resin, polyurethane resin, polyvinyl acetal resin, polyester urethane resin, cellulose ester resin, or alkyd resin, as well as a pigment or a dye having an appropriate color as a colorant. Alternatively, in place of the coating, the decorative portion 42a may be formed by a printing process. In the case of forming the decorative portion 42a by the printing process, a normally used printing method such as an offset printing method, a gravure printing method, or a screen printing method, may be utilized.

Moreover, the decorative portion 42a may be formed by a metal thin-film layer or a combination of a printed layer and a metal thin-film layer. The metal thin-film layer, which is used for expressing metallic gloss as the decorative portion 42a, can be formed by using a vacuum vapor deposition method, a sputtering method, an ion plating method, a gliding method, or the like. In this case, in accordance with a metallic gloss color to be expressed, it is possible to use metals such as aluminum, nickel, gold, platinum, chromium, iron, copper, zinc, indium, silver, titanium, lead, or zinc, an alloy of these metals, or a compound of these metals. Normally, the metal thin-film layer is partially formed. In a case where the metal thin-film layer is formed, a front anchor layer or a rear anchor layer may be provided in order to improve adhesion to another layer.

By appropriately combining the patterns of the hard coat film 41 and the decorative portion 42a with each other, variously designed patterns can be provided on the decorative area 4B of the touch input device 4. For example, when the hard coat film 41 is prepared as a colored transparent portion, with the decorative portion 42a being formed by a metal member having a metallic gloss, the decorative area 4B of the touch input device 4 is allowed to have a tint color with a colored metallic gloss. The upper electrode film 43 is bonded to the lower surface of the decorative film 42 by a transparent sticky agent (not shown).

The upper electrode film 43 is provided with an electrode supporting film 43b. An upper transparent electrode 43a and a lead-out circuit (not shown) having a predetermined pattern to be conducted with an external member such as a bus bar or a lead-out line, are formed on the lower surface of the electrode supporting film 43b. The lower surface of the peripheral portion of the upper electrode film 43 is bonded to the upper surface of the peripheral portion of a lower electrode film 44 by a sticky agent layer 45 having a rectangular frame shape. A space surrounded by the sticky agent layer 45 is formed between the upper electrode film 43 and the lower electrode film 44. The sticky agent layer 45 is prepared as, for example, paste, an adhesive agent, or a double-sided sticky tape.

The lower electrode film 44 is provided with an electrode supporting film 44b. A lower transparent electrode 44a disposed in a stripe pattern, and a lead-out circuit (not shown) having a predetermined pattern to be conductive with an external member such as a bus bar or a lead-out line, are formed on the lower surface of the electrode supporting film 44b. A plurality of spacers 44c are formed on the surface of the lower electrode film 44 opposed to the upper electrode film 43. The upper transparent electrode 43a and the lower transparent electrode 44a are prevented by these spacers 44c from being erroneously made in contact with each other. The spacers 44c may be made by forming a transparent photo-curable resin into fine dots through a photo-process or a printing method.

As the materials for the electrode supporting sheets 43b and 44b, the materials superior in transparency are preferably used. Examples of such materials include: general purpose resins such as polystyrene-based resin, polyolefin-based resin, ABS resin, AS resin, acrylic resin, and AN resin. Alternatively, as the materials for the electrode supporting sheets 43b and 44b, there may be used a general purpose engineering resin such as polyphenyleneoxide-polystyrene-based resin, polycarbonate resin, polyacetal resin, polycarbonate-modified polyphenylene ether resin, polybutylene terephthalate resin, or a ultra-high molecular polyethylene resin, or a super engineering resin such as polysulfone resin, polyphenylene sulfide resin, polyphenylene oxide resin, polyallylate resin, polyether imide resin, polyimide resin, liquid crystal polyester resin, or a polyallyl heat-resistant resin.

The respective upper transparent electrode 43a and lower transparent electrode 44a may be formed by transparent conductive films. As the material for the transparent conductive film, there may be used a metal oxide such as tin oxide, indium oxide, antimony oxide, zinc oxide, cadmium oxide, or ITO, or a thin film of a conductive polymer. As the forming method for the upper transparent electrode 43a and the lower transparent electrode 44a, for example, a method is proposed in which, after a conductive coat film has been formed on the entire surface of each of electrode supporting films 43b and 44b by a vacuum vapor deposition method, a sputtering method, an ion plating method, a CVD method, a roll coater method, or the like, unnecessary portions are etched and removed. The etching is carried out by processes in which, after forming resist on portions to be left as electrodes by a photolithography method, a screen method, or the like, the resulting films are immersed in an etching solution such as hydrochloric acid. Alternatively, the etching may be carried out by processes in which, after the formation of the resist, an etching solution is sprayed thereon so that the conductive coat film on portions having no resist formed thereon is removed, and the resulting film is then immersed in a solvent so that the resist is swelled or dissolved to be removed. Further alternatively, the respective transparent electrodes 43a and 44a may be formed by laser irradiation.

In this case, the respective transparent electrodes 43a and 44a are directly formed on the surfaces of the electrode supporting films 43b and 44b; however, the present invention is not intended to be limited thereto. For example, transparent resin films formed on surfaces thereof with transparent electrodes may be bonded to the electrode supporting films 43b and 44b. In this case, as the resin film, there may be used a resin film made of an engineering plastic such as a polycarbonate-based, polyamide-based, or polyetherketone-based plastic, or an acryl-based, polyethylene terephthalate-based, or polybutylene terephthalate-based resin film.

Figure 29:
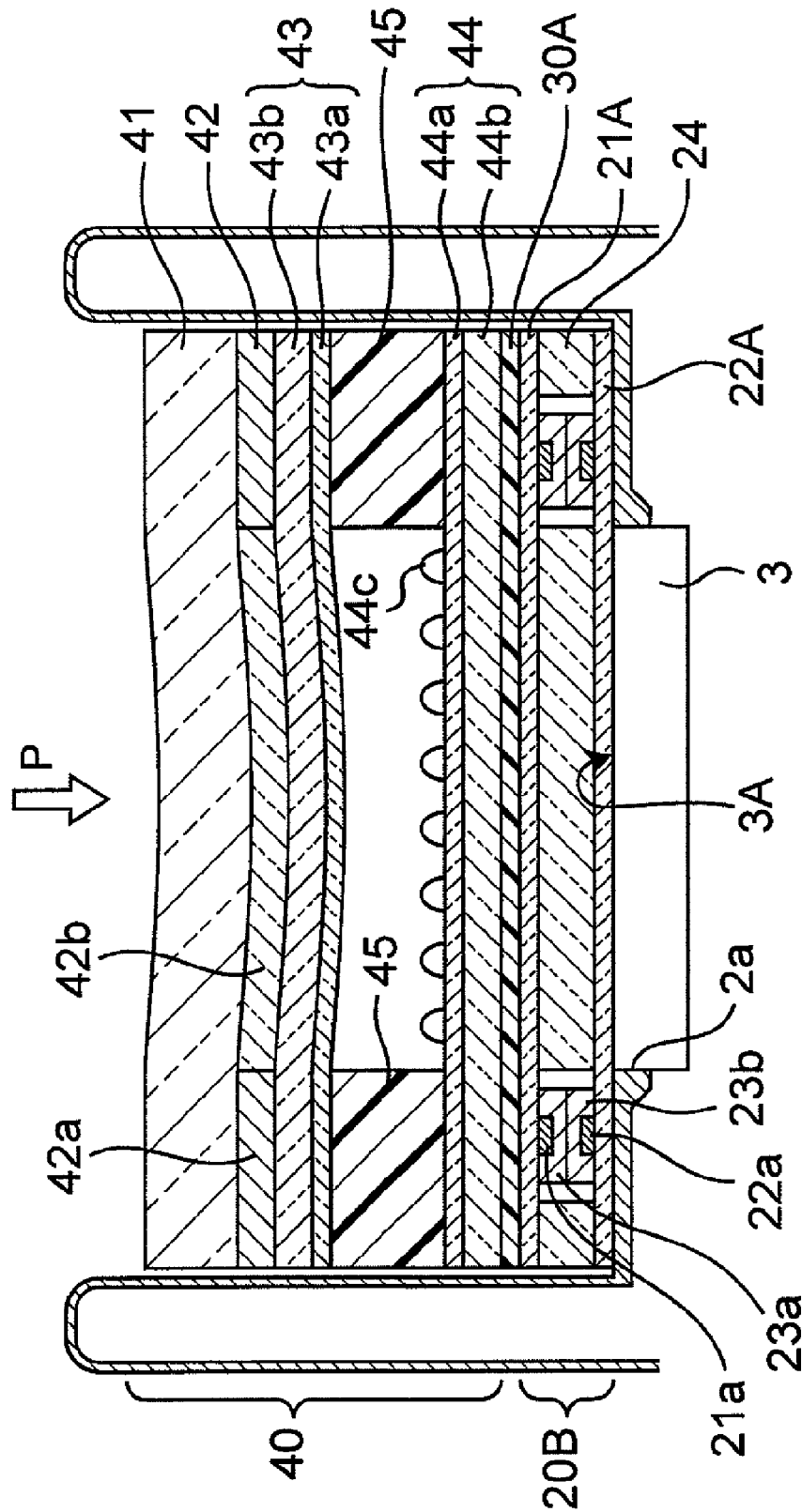
FIG. 29 is a cross-sectional view that schematically shows a state in which a pressing force is applied to the tough input device shown in FIG. 28.

FIG. 29 is a cross-sectional view that schematically shows a state in which a pressing force P is applied to the touch input device having the above-mentioned structure in accordance with the eighth embodiment of the present invention. In a case where, as shown in FIG. 29, the pressing force P is applied to a touch input surface of the touch panel main body 40 formed on the pressure sensitive sensor 20B, the upper or lower film 21A or 22A is warped or the like to be deformed by the pressing force P. Thus, at least the upper and lower pressure sensitive ink members 23a and 23b located closest to the portion subjected to the pressing force P are made in contact with each other to be conducted. Thus, the external force applied to the pressure sensitive ink member 23a can be detected, so that the pressing force P is detected.

Ninth Embodiment

Figure 30:
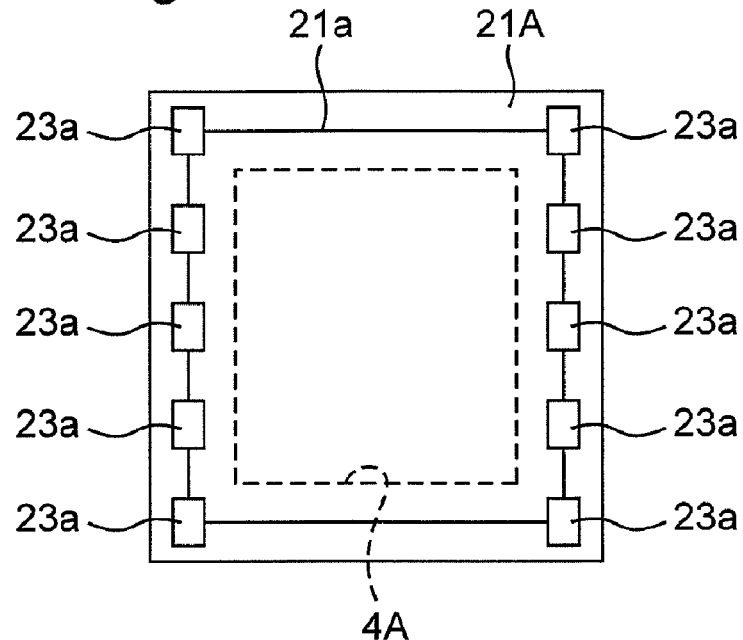
FIG. 30 is a plan view that schematically shows a layout of pressure sensitive ink members in a tough input device in accordance with a ninth embodiment of the present invention.

FIG. 30 is a plan view that schematically shows a layout of pressure sensitive ink members in a touch input device in accordance with a ninth embodiment of the present invention. The touch input device in accordance with the ninth embodiment is different from the touch input device of the eighth embodiment in that the pressure sensitive ink members 23a are formed in a broken line shape along only the edge portion of each of paired longer sides of the upper film 21A having a rectangular shape. In the ninth embodiment of the present invention, the pressure sensitive ink members 23b are formed at positions opposed to the pressure sensitive ink members 23a on the lower film 22A. That is, the pressure sensitive ink members 23b are also formed in a broken line shape along only the edge portion of each of paired longer sides of the lower film 22A having a rectangular shape. Since the layout of the pressure sensitive ink members 23b is the same as that of the pressure sensitive ink members 23a, the description thereof will not be provided.

As shown in FIG. 29, upon application of the pressing force P to the touch panel main body 40, the rectangular upper film 21A is mainly warped in a direction in parallel with the longer sides, and is hardly warped in a direction in parallel with the shorter sides. That is, the pressure sensitive ink members 23a formed along the shorter sides of the upper film 21A are hardly made in contact in comparison with the pressure sensitive ink members 23a that are formed along the longer sides of the upper film 21A, thereby hardly devoting to the detection of the pressing force P.

Moreover, in a case where, as in the first to eighth embodiments, the pressure sensitive ink members 23a are disposed on the four corner portions 121 of the upper film 21A, as the size of the touch panel main body 40 becomes greater, the distance between the adjacent pressure sensitive ink members 23a, 23a is made greater. When the distance is made greater, the warp of the longer sides of the upper film 21A becomes particularly greater, with a result that, prior to making the pressure sensitive ink members 23a into contact with the pressure sensitive ink members 23b, the upper film 21A may be in contact with the lower film 22A. In such a case, the pressure measuring precision of the pressure sensitive sensor 20B is lowered.

In contrast, in the ninth embodiment, the pressure sensitive ink members 23a are formed in the broken line shape along only each of the edge portions of the paired longer sides of the rectangular upper film 21A. In this structure, it becomes possible to prevent the lowering of the pressure measuring precision of the pressure sensitive sensor 20B. Moreover, it is also possible to eliminate the wasteful use of the pressure sensitive ink members 23a.

Figure 31:
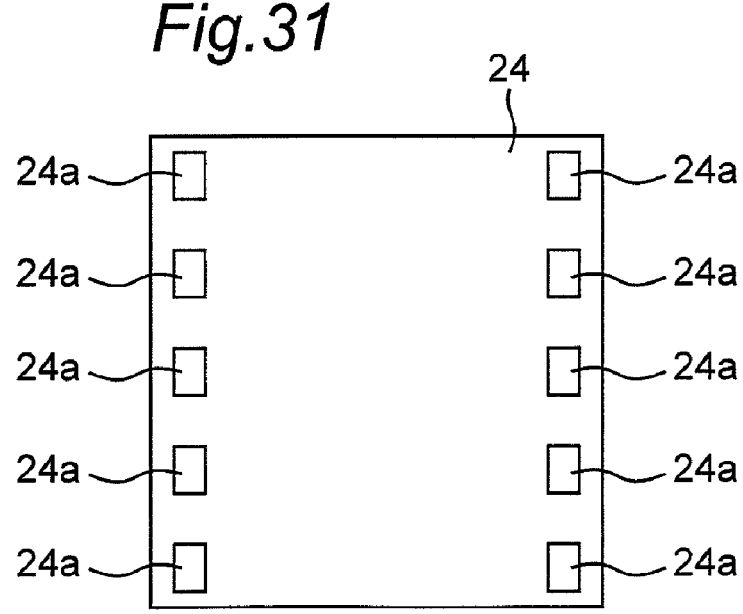
FIG. 31 is a plan view that schematically shows a structure of a gap retaining member in the touch input device in accordance with the ninth embodiment of the present invention.
Figure 32:
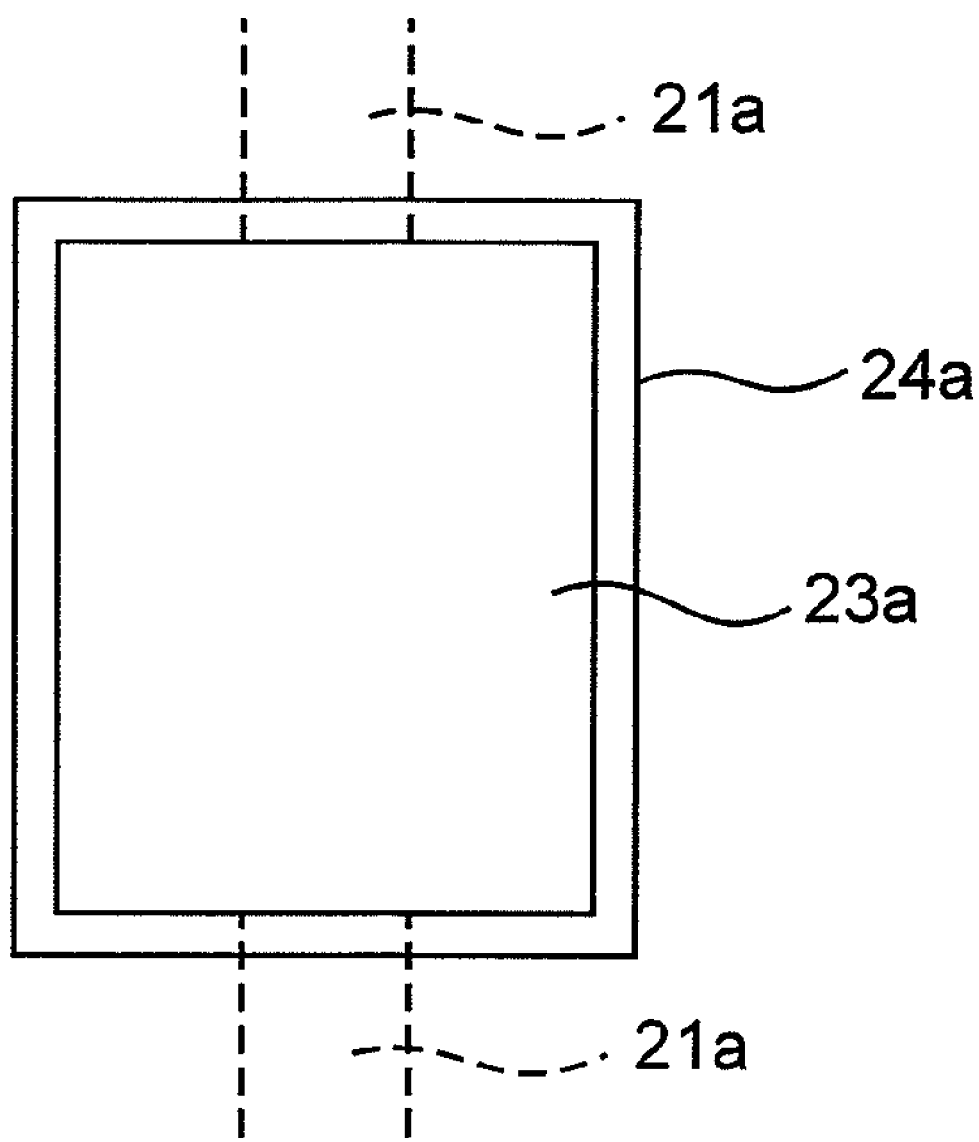
FIG. 32 is an enlarged plan view that schematically shows a state in which each pressure sensitive ink member shown in FIG. 31 is fitted into a through hole of the gap retaining member shown in FIG. 32.

As the gap retaining member 24, as shown in FIG. 31, a double-sided sticky tape provided with through holes 24a at positions corresponding to the pressure sensitive ink members 23a is preferably used. In this case, as shown in FIG. 32, the pressure sensitive ink members 23a are fitted into the through holes 24a of the double-sided sticky tape so that these two members can be made in contact with each other. Moreover, since the adhesion area between the upper film 21A and the lower film 22A is made larger, it is possible to achieve firm adhesion. Furthermore, by forming the double-sided sticky tape with use of an insulating material, it becomes possible to prevent the upper electrode 21a and the lower electrode 22a from being conductive to each other at a portion other than the through holes 24a.

Figure 33:
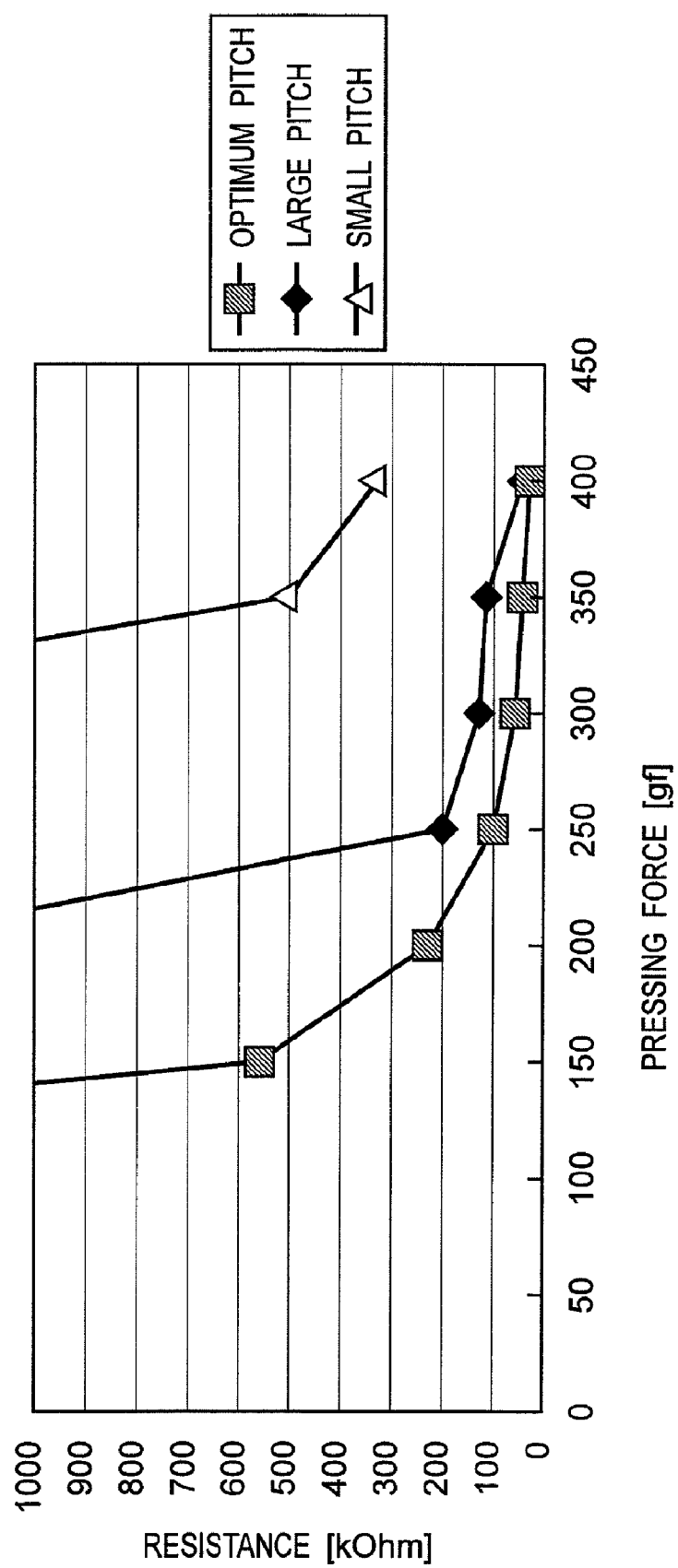
FIG. 33 is a graph that shows a relationship between a resistance value and a pressing force in each of three samples that are formed with the layout pitches of the pressure sensitive ink members being changed.

In a case where the layout pitch of the pressure sensitive ink members 23a (the length of the pressure sensitive ink member 23a+the length of the gap between the adjacent pressure sensitive ink members 23a, 23a) is too large, the warp of the upper film 21A becomes too large as described earlier, with a result that the pressure measuring precision of the pressure sensor 20B may be lowered. In contrast, in a case where the layout pitch of the pressure sensitive ink members 23a is too small, the pressure to be applied to each of the pressure sensitive ink members 23a becomes small, with a result that the pressure measuring precision of the pressure sensor 20B may be lowered. The layout pitch of the pressure sensitive ink members 23a is preferable in a range of 17.75 mm±8 mm, that is, from 9.75 mm to 25.75 mm. FIG. 33 is a graph that shows a relationship between the resistance value and the pressing force in three samples that are formed with varied layout pitches. As shown in FIG. 33, the sample having an optimal layout pitch of the pressure sensitive ink members exerts the best F (pressing force)–R (resistance) characteristic. In FIG. 33, the optimal pitch is 11 mm, the large pitch is 50 mm, and the small pitch is 5 mm.

Figure 34:
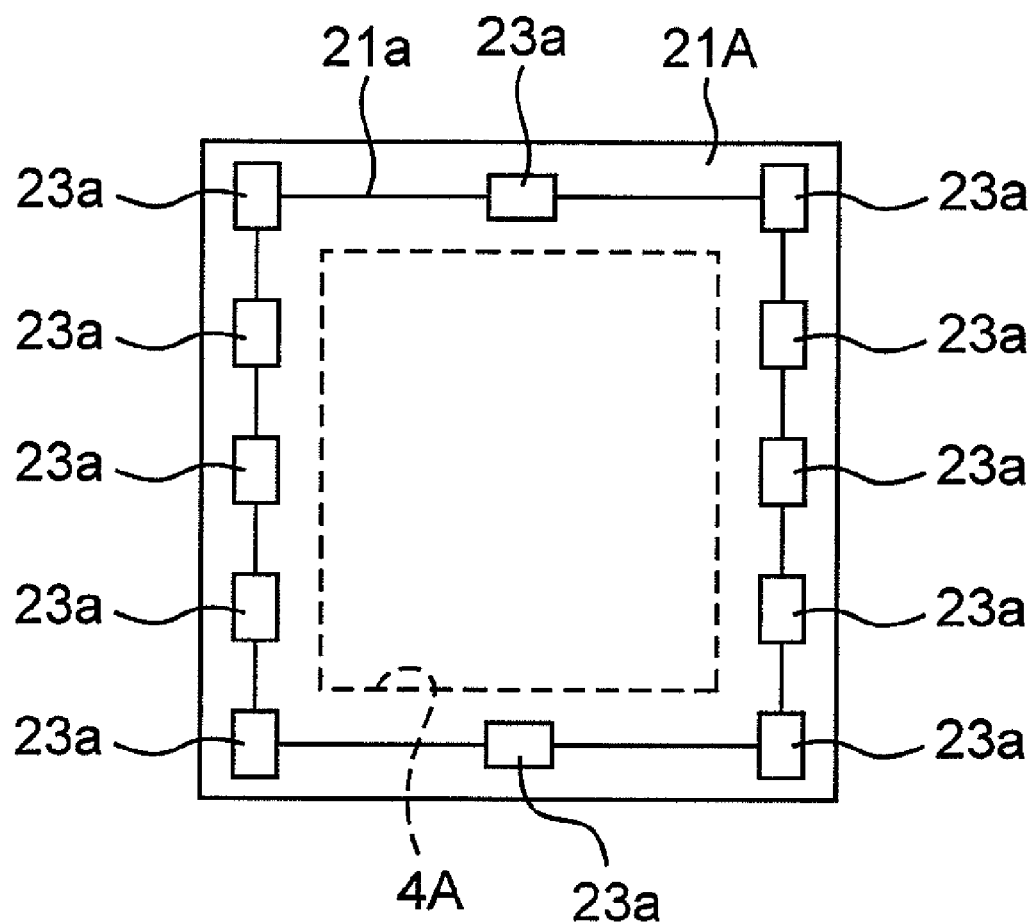
FIG. 34 is a plan view that schematically shows a modified example of the layout of the pressure sensitive ink members shown in FIG. 30.

In the ninth embodiment, no pressure sensitive ink members 23a are formed on each of edge portions of the paired shorter sides of the upper film 21A; however, a plurality of pressure sensitive ink members 23a may of course be formed along the edge portions of the shorter sides. In this case, the pressure sensitive ink members 23a on the edge portions of the shorter sides of the upper film 21A may be disposed with the layout pitch same as that of the pressure sensitive ink members 23a on the edge portions of the longer sides of the upper film 21A. Moreover, as shown in FIG. 34, the pressure sensitive ink members 23a on the edge portions of the shorter sides of the upper film 21A may be disposed with a layout pitch (for example, only on the center portions of the shorter sides) larger than the layout pitch of the pressure sensitive ink members 23a on the edge portions of the longer sides of the upper film 21A.

(Evaluation Test of Pressure Measuring Precision)

Next, a test was carried out so as to confirm that a pressure sensitive sensor formed by disposing pressure sensitive ink members in a scattered manner on an electrode in a rectangular frame shape, would have an effect for improving the pressure measuring precision, and the results of the test will be described.

Figure 35:
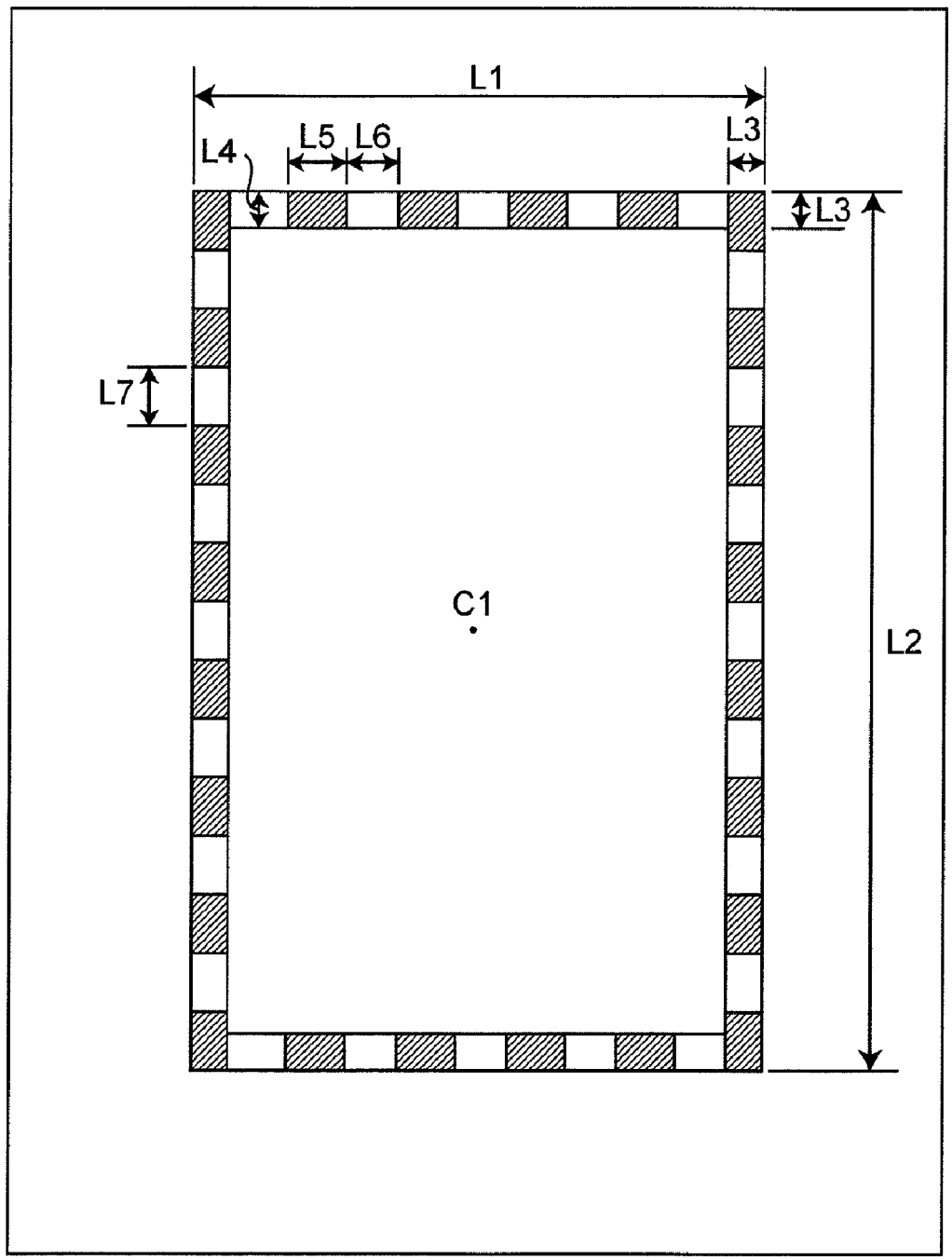
FIG. 35 is a plan view that shows a layout of pressure sensitive ink members in a sample of an embodiment of the present invention.
Figure 36:
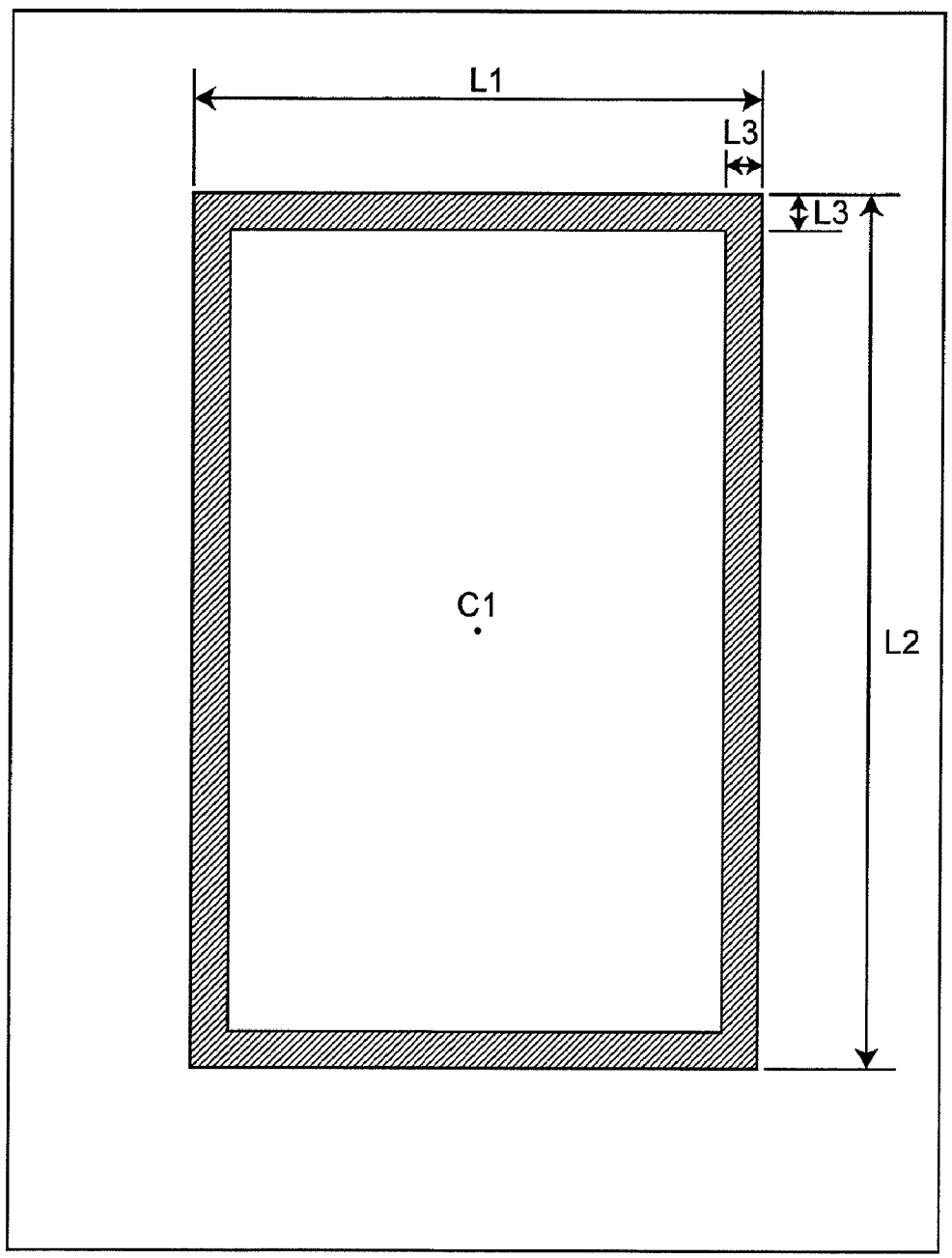
FIG. 36 is a plan view that shows a layout of pressure sensitive ink members in a sample of a comparative example.

In one embodiment of the present invention, a silver electrode was disposed on a polyethylene terephthalate (PET) film base member in a rectangular frame shape, and on the silver electrode, pressure sensitive ink members were disposed in a scattered manner as shown in FIG. 35, and was then bonded to a glass substrate so that three samples S1 to S3 were prepared. Moreover, as a comparative example thereof, a silver electrode was disposed on a polyethylene terephthalate (PET) film base member in a rectangular frame shape as shown in FIG. 36, and on the silver electrode, pressure sensitive ink members were disposed in a rectangular frame shape, and was then bonded to a glass substrate so that three samples S4 to S6 were prepared.

The silver electrode was formed into a rectangular frame shape with 49 mm in shorter side, 76 mm in longer side, 3 mm in width, and 12 µm in thickness. Each of the pressure sensitive ink members disposed in the scattered manner had a rectangular shape of 5.0 mm×3.0 mm. Moreover, a gap L6 between the pressure sensitive ink members adjacent to each other in the shorter side direction was set to about 4.6 mm, and a gap L7 between the pressure sensitive ink members adjacent to each other in the longer side direction was set to about 5.14 mm. In this case, the layout pitch was set to about 10.14 mm (=5.0 mm+5.14 mm). The thickness of each of the pressure sensitive ink members was set to 10 µm. As the material for the pressure sensitive ink members, "QTC" (trade name, manufactured by Peratech Ltd. in England) was used.

Each of the samples S1 to S6 was disposed on a test bench, with the surface provided with the pressure sensitive ink members facing down, weights were disposed on the center portions C1 and C2 on the glass substrate of each of the samples S1 to S6, and an electric current was then allowed to flow through the silver electrode so that a resistance value was measured. This operation was repeated a plurality of times with the weight of each of the weights being changed, so that the resistance value relative to the pressing forces received by the pressure sensitive ink members from the glass substrate and the weights was measured in each of the cases.

Figure 37:
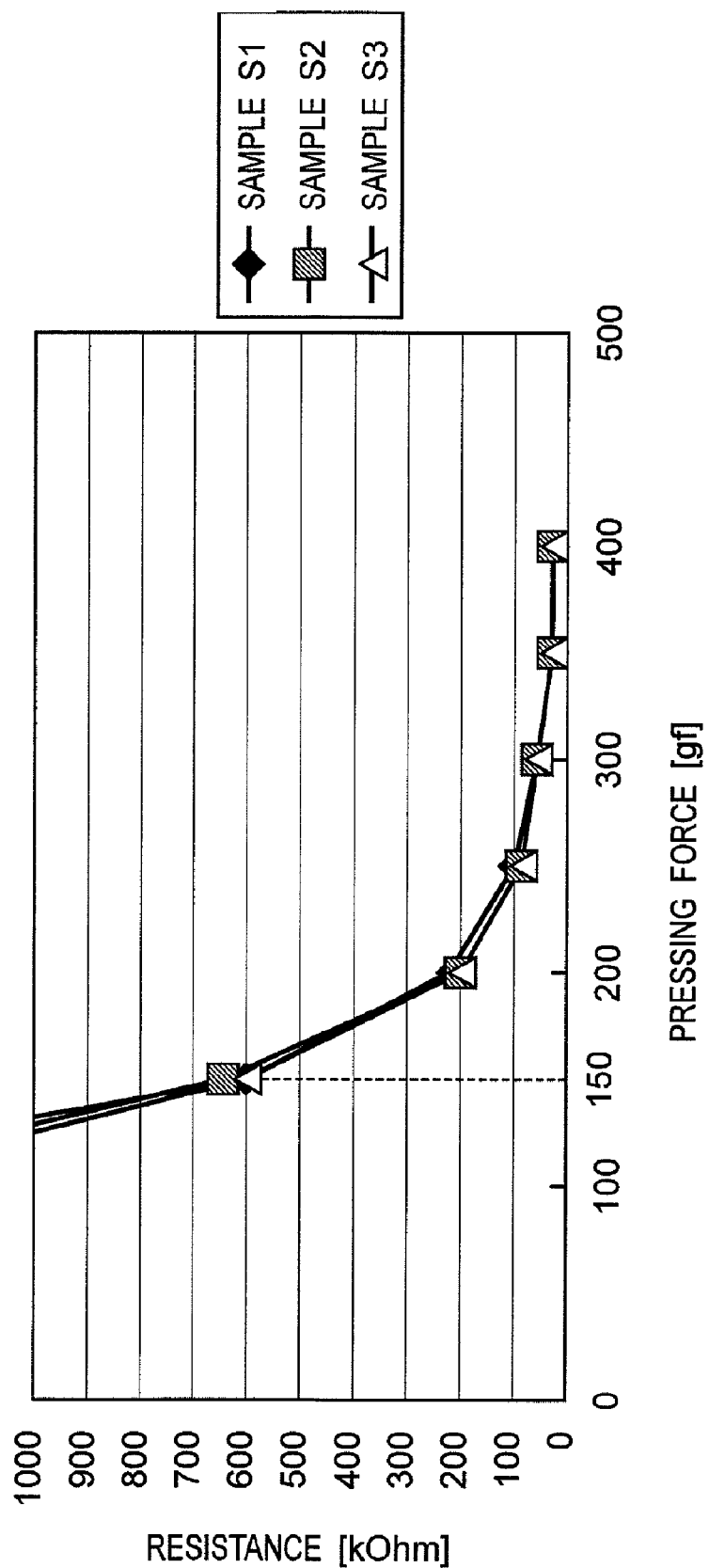
FIG. 37 is a graph that shows a relationship between a resistance value and a pressing force in each of three samples in accordance with embodiments of the present invention.
Figure 38:
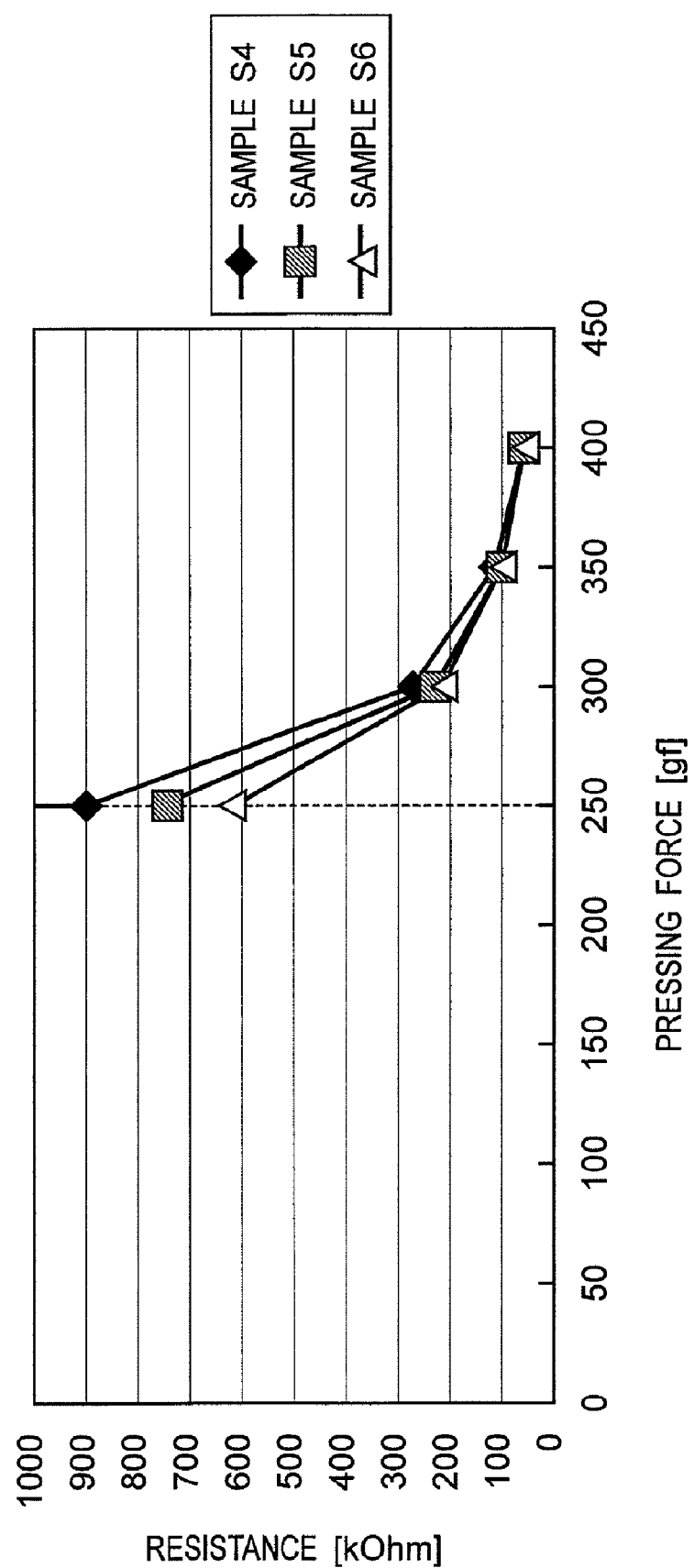
FIG. 38 is a graph that shows a relationship between a resistance value and a pressing force in each of three samples in accordance with the comparative example.

FIG. 37 is a graph that shows a relationship between the resistance value and the pressing force in each of the samples S1 to S3, and FIG. 38 is a graph that shows a relationship between the resistance value and the pressing force in each of the samples S4 to S6.

As shown in FIG. 38, in the samples S4 to S6 having the pressure sensitive ink members in the rectangular frame shape, as the pressing force became smaller, more deviations occurred in the resistance value of each of the samples. The deviations in the resistance value became in particular significant when the pressing force was smaller than 300 gf. In the case of the pressing force of less than 250 gf, it was not possible to measure the resistance value.

In contrast, in the samples S1 to S3 in which the pressure sensitive ink members were disposed in the scattered manner as shown in FIG. 37, in a case where the pressing force was about 150 gf or more, any of the samples exerted virtually the same resistance value.

The above-mentioned results of the test make it possible to confirm that, by disposing the pressure sensitive ink members in the scattered manner on the electrode disposed in the rectangular frame shape, the pressure measuring precision can be improved.

Next, a test was carried out so as to confirm that a pressure sensitive sensor, which is formed by disposing pressure sensitive ink members in a scattered manner only on each of paired longer sides of an electrode disposed in a rectangular frame shape as in the ninth embodiment, would have an effect for improving the pressure measuring precision, and the results of the test will be described.

In this case, the processes same as those of the samples S1 to S3 were carried out except that the pressure sensitive ink members were disposed in a scattered manner only on each of the paired longer sides of the silver electrode so that three samples S7 to S9 were prepared.

Figure 39:
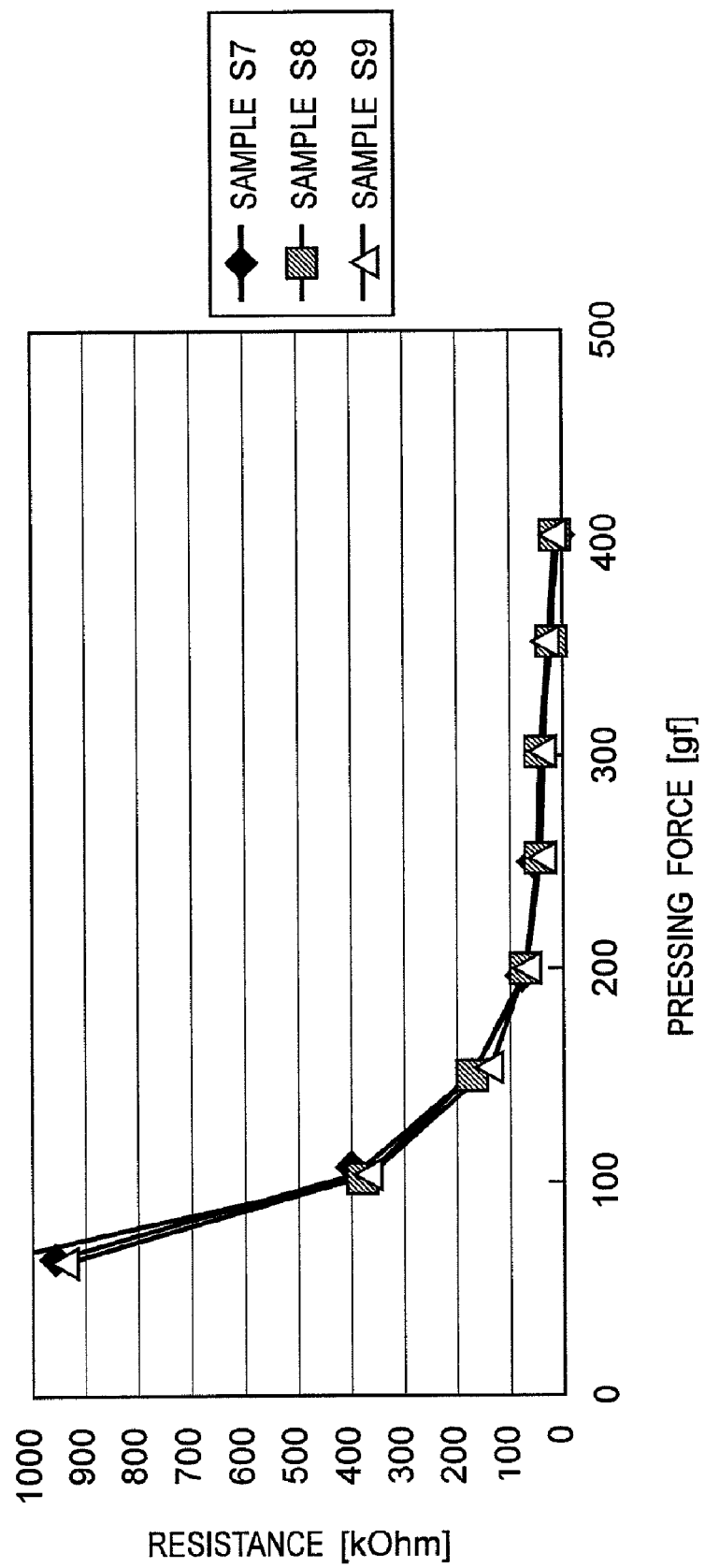
FIG. 39 is a graph that shows a relationship between a resistance value and a pressing force in each of three samples in accordance with the second embodiment of the present invention.

FIG. 39 is a graph that shows a relationship between the resistance value and the pressing force in each of the samples S7 to S9.

In the samples S7 to S9, as shown in FIG. 39, in a case where the pressing force was about 100 gf or more, any of the samples exerted virtually the same resistance value.

The above-mentioned results of the tests make it possible to confirm that, by disposing the pressure sensitive ink members in the scattered manner only on each of the paired longer sides of the electrode disposed in the rectangular frame shape, the pressure measuring precision can be improved.

By properly combining arbitrary embodiments of the aforementioned various embodiments, the effects owned by each of them can be made effectual.

INDUSTRIAL APPLICABILITY

Since the pressure sensitive sensor of the present invention makes it possible to suppress degradation of visibility of the display unit of the display device even when mounted on an electronic device, and also to improve the pressure measuring precision, it can be effectively applied to electronic devices inclusive of portable information terminals such as a PDA and a handy terminal, OA apparatuses such as a copying machine and a facsimile, a smart telephone, a portable telephone, a portable game apparatus, an electronic dictionary, a car navigation system, a small-size PC, and various domestic electronic appliances.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2008-330284 and No. 2008-330288 filed on Dec. 25, 2008 and Japanese Patent Application No. 2009-047006 filed on Feb. 27, 2009 including specification, claims, drawings, and summary are incorporated herein by reference in its entirety.

The invention claimed is:

1. A touch panel having a press detection function, said touch panel comprising:
    a pressure sensitive sensor for said touch panel, wherein said pressure sensitive sensor for said touch panel includes:
    a first substrate having a surface;
    a second substrate having a surface and being disposed so as to be opposed to said first substrate;
    a pair of electrodes disposed on one of said surface of said first substrate opposed to said second substrate and said surface of said second substrate opposed to said first substrate, or disposed separately on both of said surfaces;
    pressure sensitive ink members having a conductive property of which an electric characteristic is varied by a pressing force applied thereto, each pressure sensitive ink member of said pressure sensitive ink members being disposed on said surface of said first substrate opposed to said second substrate or said surface of said second substrate opposed to said first substrate with a gap interposed from at least one of said pair of electrodes; and
    a gap retaining member disposed on an opposed area between said first substrate and said second substrate, said gap retaining member having a sticking property such that said first substrate and said second substrate are bonded to each other and retain the gap between each of said pressure sensitive ink members and said at least one of said pair of electrodes,
    said pair of electrodes are respectively disposed in a frame shape along an edge portion of said first or second substrate,
    said pressure sensitive ink members are located in a scattered manner along said edge portion of said first substrate or said second substrate, and disposed so that when, upon application of an external force in a thickness direction of said first substrate, said first substrate or said second substrate is deformed, said pressure sensitive ink member is put in contact with both of said pair of electrodes so that said pair of electrodes are made to be conductive to each other,
    said gap retaining member is disposed so as to cover at least one of said pair of electrodes located between said pressure sensitive members adjacent to each other when viewed in the thickness direction of said first substrate.

2. The touch panel having a press detection function according to claim 1, wherein said gap retaining member is double-sided sticky tape with a sticky agent being applied onto two surfaces of a core member.

3. The touch panel having a press detection function according to claim 1, wherein said pressure sensitive ink members are dots disposed on a plurality of corners of said first substrate or said second substrate.

4. The touch panel having a press detection function according to claim 1, wherein each of said first substrate and said second substrate has a rectangular outer shape, and
    said pressure sensitive ink members have a broken line shape along only each of edge portions of paired longer sides of said first substrate or said second substrate.

5. The touch panel having a press detection function according to claim 1, wherein said pressure sensitive ink members are disposed at a pitch in a range of from 9.75 mm to 25.75 mm.

6. The touch panel having a press detection function according to claim 1, wherein each of said first substrate, said second substrate, and said gap retaining member has a frame shape.

7. The touch panel having a press detection function according to claim 1, wherein each of said first substrate and said second substrate is a transparent material having a flat plate shape, with a transparent window portion on a portion without said pair of electrodes disposed therein.

8. The touch panel having a press detection function according to claim 7, wherein a transparent electromagnetic shielding member is disposed on said first substrate or said second substrate so as to include said transparent window portion.

9. The touch panel having a press detection function according to claim 7, wherein said second substrate has a transparent electrode formed on said transparent window portion of said surface opposed to said first substrate into a stripe pattern in one direction.

10. The touch panel having a press detection function according to claim 9, wherein a third substrate is stacked on a surface of said second substrate on a side without said pair of electrodes formed thereon, with a sticky agent interposed therebetween, and
    said third substrate is a transparent material having a flat plate shape, and has a transparent electrode disposed on an area corresponding to said transparent window portion of said surface opposed to said second substrate into a stripe pattern in a direction crossing the one direction.

11. The touch panel having a press detection function according to claim 1, further comprising:
    a supporting member stacked and disposed on at least one of said surface of said first substrate and said surface of said second substrate on a side without said pair of electrodes disposed thereon.

12. The touch panel having a press detection function according to claim 11, wherein said supporting member is on a rear side of a position where said pressure sensitive ink member is disposed.

13. The touch panel having a press detection function according to claim 1, wherein
    one of said pair of electrodes is disposed on said first substrate,
    an other one of said pair of electrodes is disposed on said second substrate, and
    said pressure sensitive ink members are provided to cover a plurality of portions of said one or said other one of said pair of electrodes.

14. The touch panel having a press detection function according to claim 13, wherein each electrode of said pair of electrodes are covered with either one of said pressure sensitive ink member or said gap retaining member.

15. The touch panel having a press detection function according to claim 1, wherein
    said pair of electrodes are disposed on said first substrate with a gap therebetween, and
    said pressure sensitive ink members are disposed on said second substrate.

16. A pressure sensitive sensor for a touch panel comprising:
    a first substrate having a surface;
    a second substrate having a surface and being disposed so as to be opposed to said first substrate;
    a pair of electrodes disposed on one of said surface of said first substrate opposed to said second substrate and said surface of said second substrate opposed to said first substrate, or disposed separately on both of said surfaces;
    pressure sensitive ink members having a conductive property of which an electric characteristic is varied by a pressing force applied thereto, each pressure sensitive ink member of said pressure sensitive ink members being disposed on said surface of said first substrate opposed to said second substrate or said surface of said second substrate opposed to said first substrate with a gap interposed between at least one of said pair of electrodes; and a gap retaining member disposed on an opposed area between said first substrate and said second substrate, said gap retaining member having a sticking property such that said first substrate and said second substrate are bonded to each other and retain the gap between each of said pressure sensitive ink members and said at least one of said pair of electrodes, said pair of electrodes are respectively disposed in a frame shape along an edge portion of the first or second substrate, said pressure sensitive ink members are located in a scattered manner along said edge portion of said first substrate or said second substrate, and disposed so that when, upon application of an external force in a thickness direction of said first substrate, said first substrate or said second substrate is deformed, said pressure sensitive ink member is put in contact with both of said pair of electrodes so that said pair of electrodes are made to be conductive to each other, said gap retaining member is disposed so as to cover at least one of said pair of electrodes located between said pressure sensitive members adjacent to each other when viewed in the thickness direction of said first substrate.

* * * * *